(12) United States Patent
Kwon et al.

(10) Patent No.: US 8,321,734 B2
(45) Date of Patent: Nov. 27, 2012

(54) METHOD AND APPARATUS TO TRANSMIT AND/OR RECEIVE DATA VIA WIRELESS NETWORK AND WIRELESS DEVICE

(75) Inventors: Chang-yeul Kwon, Yongin-si (KR); Se-young Shin, Suwon-si (KR); Seong-wook Lee, Yongin-si (KR); Dong-hwi Roh, Seoul (KR); Guoping Fan, Suwon-si (KR); Jae-moon Jo, Seongnam-si (KR); Ho-seok Lee, Anyang-si (KR); Moon-young Choi, Seoul (KR); Joong-suk Park, Seongnam-si (KR); Seung-seop Shim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 916 days.

(21) Appl. No.: 11/503,155

(22) Filed: Aug. 14, 2006

(65) Prior Publication Data
US 2007/0127424 A1    Jun. 7, 2007

(30) Foreign Application Priority Data

Aug. 12, 2005  (KR) .................. 10-2005-0074416
Nov. 3, 2005   (KR) .................. 10-2005-0105004

(51) Int. Cl.
*H04L 1/18*    (2006.01)

(52) U.S. Cl. ........ 714/748; 714/746; 714/749; 714/752; 714/758; 348/425.2; 348/466; 370/338; 370/349; 370/473; 370/474

(58) Field of Classification Search .................. 370/236, 370/338, 278, 401, 337, 394, 423
See application file for complete search history.

(56) References Cited

U.S. PATENT DOCUMENTS

| | | | |
|---|---|---|---|
| 5,677,918 | A | 10/1997 | Tran et al. |
| 5,693,559 | A | 12/1997 | Taniguchi et al. |
| 6,021,516 | A | 2/2000 | Okajima et al. |
| 6,151,696 | A | 11/2000 | Miller et al. |
| 2004/0032960 | A1 | 2/2004 | Griesinger |

(Continued)

FOREIGN PATENT DOCUMENTS

JP    06-165079    6/1994

(Continued)

OTHER PUBLICATIONS

Dubreuil, Alain et al.; Multi-standard compilation for multimedia delivery service within the home; May 2004; Medianet IST-Project: FP6-507452.*

(Continued)

*Primary Examiner* — Anthony Addy
*Assistant Examiner* — Manpreet Matharu
(74) *Attorney, Agent, or Firm* — Stanzione & Kim, LLP

(57) ABSTRACT

A method of and an apparatus to improve stability and efficiency during data transmission performed over a wireless network includes transmitting a first data frame containing a plurality of data units to a receiving device, receiving from the receiving device a receipt of confirmation for each data unit received by the receiving device, and transmitting a second data frame containing at least one of the plurality of data units that have not been transmitted or received, according to the receipt of confirmation for each data unit received by the receiving device.

19 Claims, 21 Drawing Sheets

U.S. PATENT DOCUMENTS

| | | | |
|---|---|---|---|
| 2005/0083847 A1* | 4/2005 | Rollet | 370/236 |
| 2005/0135643 A1 | 6/2005 | Lee et al. | |
| 2005/0237994 A1 | 10/2005 | Fong et al. | |
| 2005/0265297 A1* | 12/2005 | Nakajima et al. | 370/338 |
| 2006/0062410 A1 | 3/2006 | Kim et al. | |
| 2006/0133379 A1* | 6/2006 | Krishnan et al. | 370/394 |

FOREIGN PATENT DOCUMENTS

| | | | |
|---|---|---|---|
| JP | 2000-059898 | | 2/2000 |
| KR | 10-2002-0089478 | | 11/2002 |
| KR | 10-2005-0056647 | | 6/2005 |
| KR | 10-2005-0060789 | | 6/2005 |
| KR | 10-2006-0026730 | | 3/2006 |
| WO | WO 00/60797 | * 4/2000 | 370/236 |
| WO | WO 00/60797 | | 10/2000 |
| WO | WO 01/80476 | | 10/2001 |
| WO | WO 01/80476 A1 | | 10/2001 |

OTHER PUBLICATIONS

Mathis et al. (RFC 2018 for a proposed standard of TCP Selective Acknowledgment Options submitted to Network Working Group in Oct. 1996).*

PCT Search Report dated Oct. 30, 2006 issued in PCT/KR2006-3148.

Korean Office Action dated Oct. 25, 2006 issued in KR 2005-105004.

CN Office Action issued Jun. 17, 2011 in CN Patent Application No. 200680029174.4.

KR Office Action issued Sep. 13, 2006 in KR Application No. 10-2005-0074416.

KR Office Action issued Oct. 25, 2006 in KR Application No. 10-2005-0105004.

KR Office Action issued Dec. 15, 2006 in KR Application No. 10-2005-0074416.

KR Notice of Allowance issued May 31, 2007 in KR Patent Application No. 10-2006-0018428.

Chinese Decision of Rejection Issued on Jan. 31, 2012 in CN Patent Application No. 200680029174.4.

Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-Speed Physical Layer in the 5 GHZ Band (IEEE Std 802.11a-1999) (Print ISBN 0-7381-1809-5 SH94787).

Information Technology—Telecommunications and Information Exchange Between Systems—Local and Metropolitan Area Networks—Specific Requirements—Part 11: Wireless LAN Medium Access Control (MAC) and Physical Layer (PHY) Specifications (ANSI/IEEE Std 802.11, 1999 Edition).

* cited by examiner

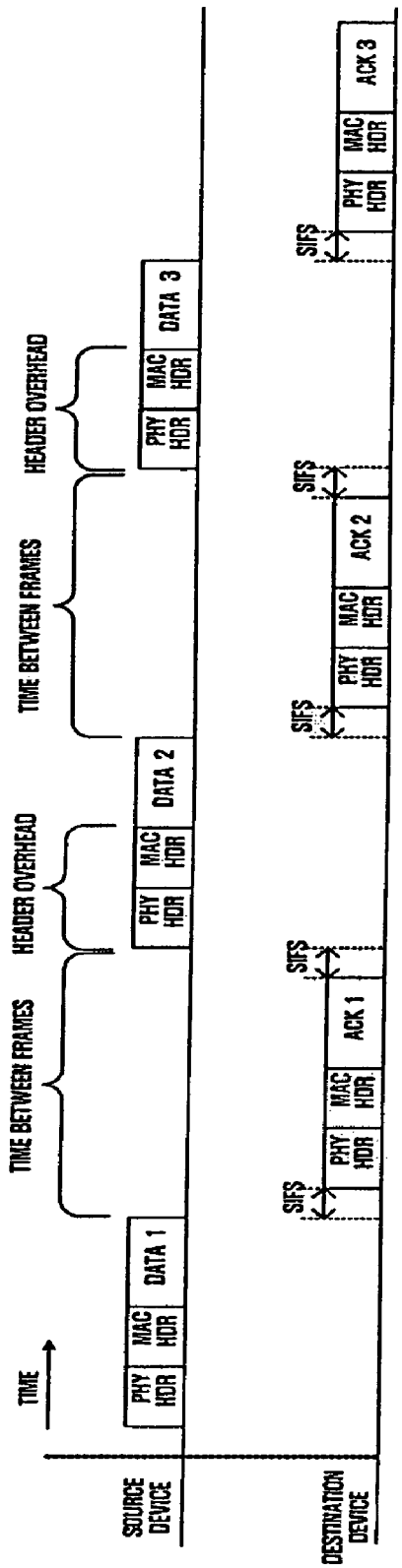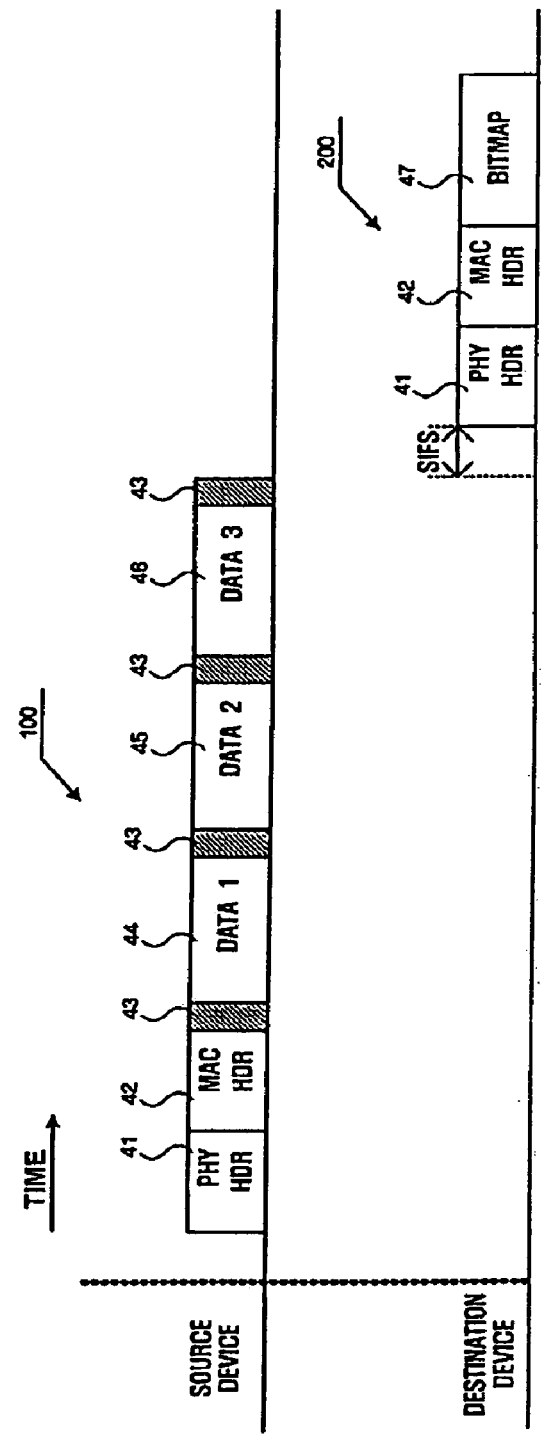

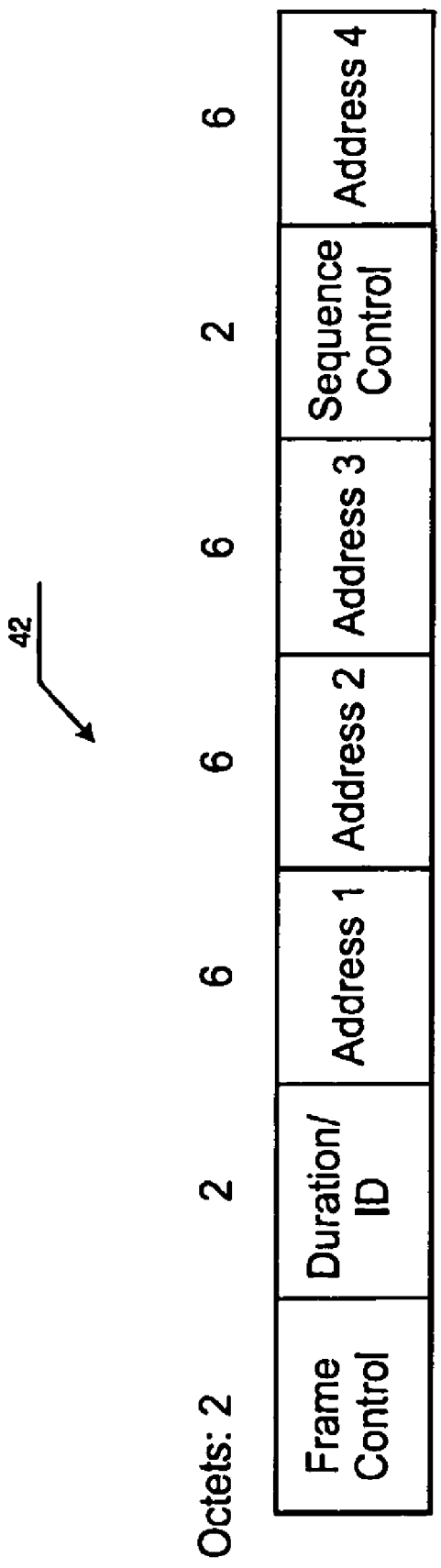

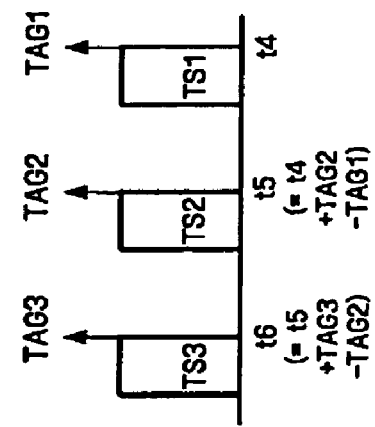
FIG. 8A
TRANSMITTING DEVICE
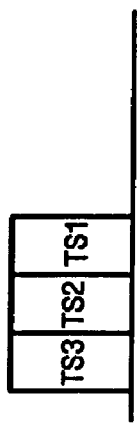
FIG. 8B
DURING TRANSMISSION
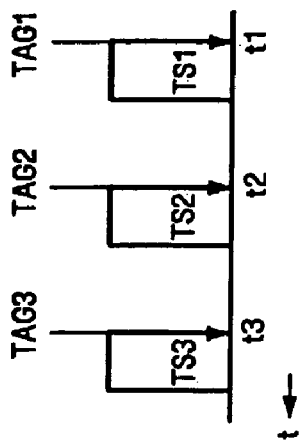
FIG. 8C
RECEIVING DEVICE
FIG. 9
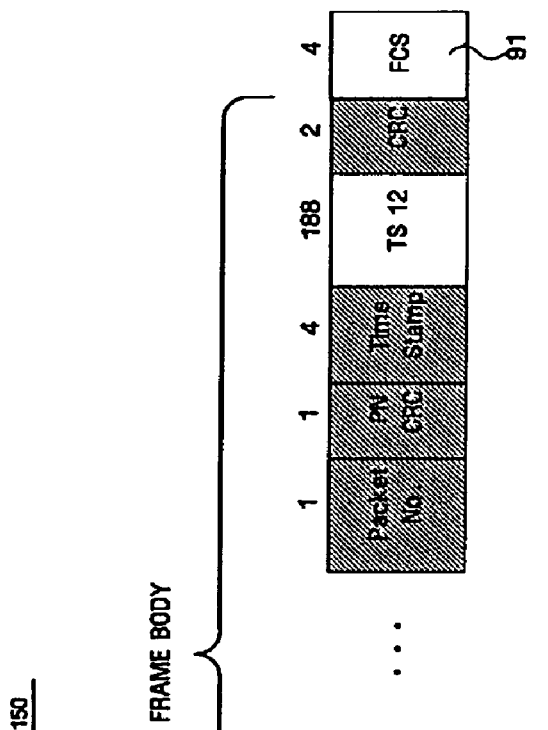
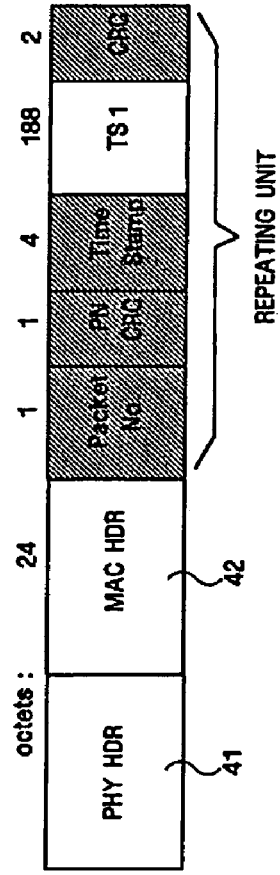

FIG. 17A

| PHY HDR | MAC HDR | TS 2 | TS 8 |

FIG. 17B

| PHY HDR | MAC HDR | TS 1 | TS 2 | TS 3 | TS 4 | TS 5 | TS 6 | TS 7 | TS 8 | TS 9 | TS 10 | TS 11 | TS 12 |

FIG. 17C

| PHY HDR | MAC HDR | TS 2 | TS 6 | TS 8 | TS 13 | TS 14 | TS 15 | TS 16 | TS 17 | TS 18 | TS 19 | TS 20 | TS 21 |

FIG. 17D

| PHY HDR | MAC HDR | TS 2 | TS 2 | TS 2 | TS 2 | TS 6 | TS 6 | TS 6 | TS 8 | TS 8 | TS 8 | TS 8 | TS 8 |

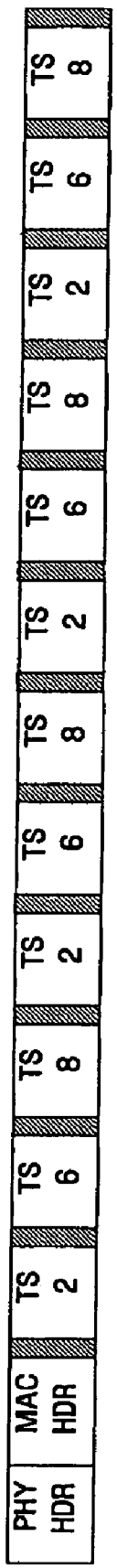
FIG. 17E
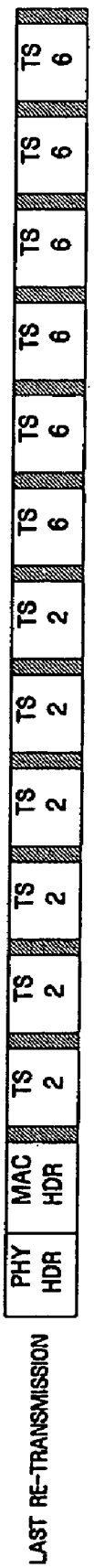
FIG. 17F
1ST RE-TRANSMISSION
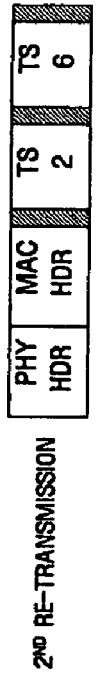
2ND RE-TRANSMISSION
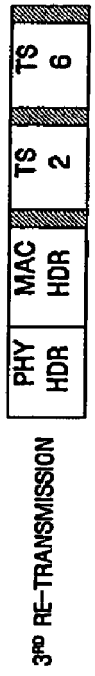
3RD RE-TRANSMISSION
LAST RE-TRANSMISSION
: TS 8 SUCCESSFULLY TRANSMITTED

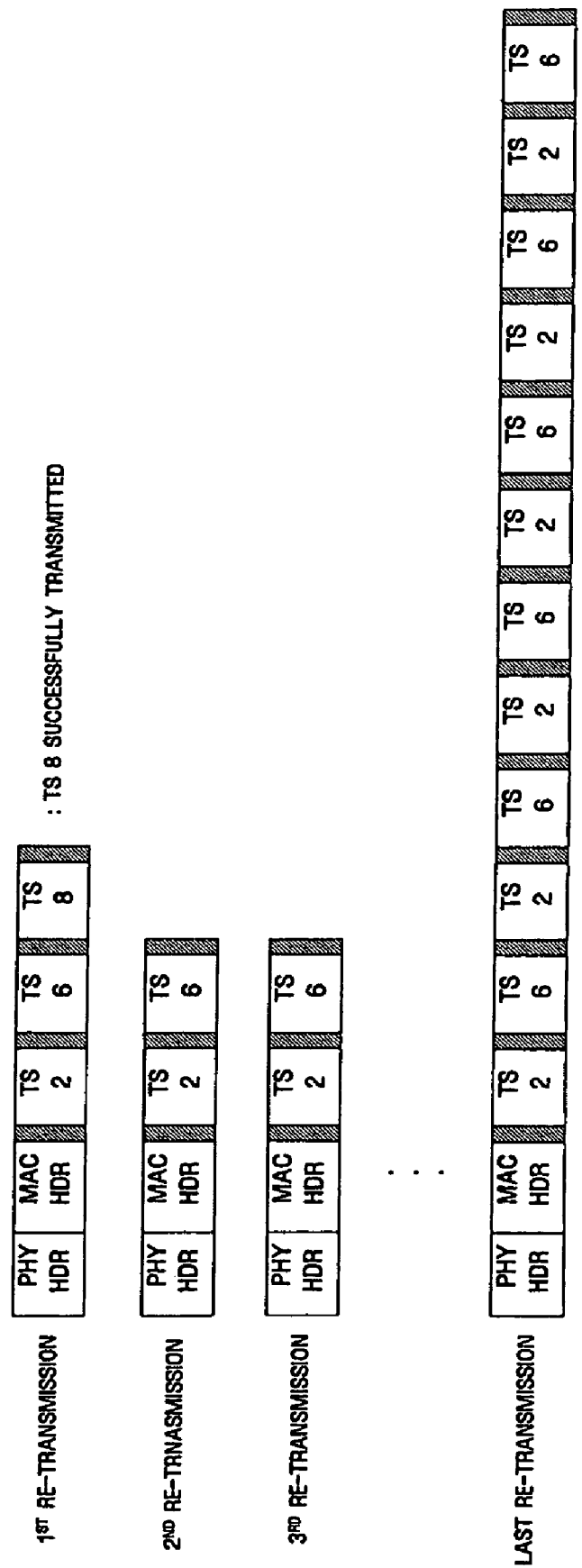

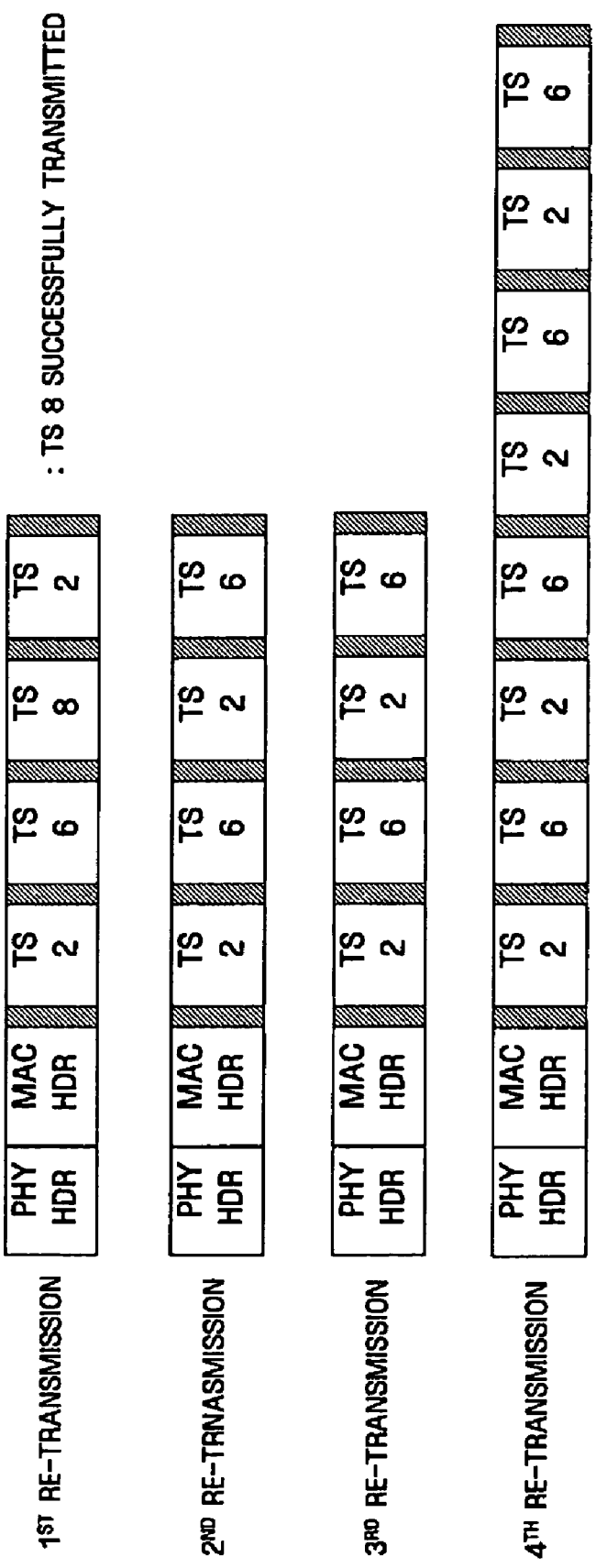

METHOD AND APPARATUS TO TRANSMIT AND/OR RECEIVE DATA VIA WIRELESS NETWORK AND WIRELESS DEVICE

CROSS-REFERENCE TO RELATED APPLICATIONS

This application claims priority from Korean Patent Application Nos. 10-2005-0074416 and 10-2005-0105004 filed on Aug. 12, 2005 and Nov. 3, 2005, respectively, the disclosures of which are incorporated herein in their entirety by reference.

BACKGROUND OF THE INVENTION

1. Field of the Invention

The present general inventive concept relates to a wireless communication system, and more particularly, to a method and apparatus to improve stability and efficiency of data transmission over a wireless network.

2. Description of the Related Art

Recently, as wireless communication networks have been widely used, and a large-volume of multimedia data is transmitted through the wireless communication networks, there is a need to develop a better and more efficient method of transmitting data over the wireless communication networks. Due to existing characteristics of conventional wireless networks, which are accessed a large number of devices, operating characteristics of the convention wireless networks deteriorate with increased data traffic, which often results in data collision or loss during transmission. In order to prevent the data collision or loss and to receive/transmit data reliably, a distributed coordination function (DCF) on a competitive basis and a point coordination function (PCF) on a non-competitive basis have been employed in wireless local area networks (LAN). In wireless personal area networks (PAN), channel time allocation has been employed.

Although these methods employed in the wireless networks reduce the data collision to some degree and facilitate stable data transmission, there is still a high chance of the data collision during transmission, compared to wired networks, due to various factors, such as multi-path fading and interference that affect stable data transmission. In addition, as the number of wireless devices that access a wireless network increases, the data collision and loss increases.

The data collision and loss result in re-transmission of the lost data which adversely affects the throughput of a wireless network. In particular, for A/V data which requires a high quality of service (QoS), it is critical to have a sufficient bandwidth to minimize the number of re-transmissions.

FIG. 1 is a view illustrating a method of transmitting data over a conventional wireless network. When a device in the wireless network, that is, a transmitting device or source device, sends a data frame to another device in the wireless network, that is, a receiving device or destination device, the transmitting device generates a media access control (MAC) layer (MAC header (MAC HDR) or a physical (PHY) layer header (PHY HDR), appends the generated MAC HDR and PHY HDR to the data to form the data frame, and transmits the data frame.

The receiving device that receives the data is able to check for errors via a frame check sequence (FCS), and sends the received data to an upper layer if no error has been found.

An IEEE 802.11 protocol assures a short inter-frame space (SIFS), i.e., a minimum space between frames. The SIFS includes a delay in the PHY layer, and a time required to process the frame and a turnaround time of a receiving/transmitting device (RX/TX) in the MAC layer. That is, the SIFS is a time indicated by the protocol to receive a single frame from a single device, process the frame, and generate and send a response frame. Therefore, if the transmitting device transmits numerous frames to the receiving device, time is needed to transmit the frames as well as to transmit corresponding SIFS and response frames.

FIG. 2 is a view illustrating a conventional method of handling errors generated during transmission between wireless devices. Referring to FIG. 2, the conventional method includes handling a transmission failure between a transmitting (source) device and a receiving (destination) device in a wireless network environment, when the transmission failure has been caused by various reasons or when an error occurs in the transmitted frame.

In the transmitting device, a counter "acknowledge (ACK) Timeout" starts countdown from the moment of transmitting the frame. When the transmitting device fails to receive an ACK frame (hereinafter, referred to as "ACK") from the receiving device when the counter reaches zero, the transmitting device determines a transmission failure and re-transmits the frame. The frames that have not been transmitted or the frames with errors are illustrated as dotted lines in FIG. 2.

The number of re-transmissions depends on a value of "retry limit" set in the transmitting device. If the transmitting device fails to re-transmits by the retry limit, the transmitting device skips the frame. As illustrated in FIG. 2, the frame with data 2 is skipped. The receiving device checks out the received frame to find MAC FCS and if no error is found, the receiving device sends the data appended to the received frame to an upper layer and sends a response frame to the received frame, that is, an ACK, to the transmitting device. If an error is found, the receiving device stop forming and sending the corresponding frame.

As illustrated in FIG. 3, the transmitting device regards all times except for a time required to transmit a frame, as a wasted time. the wasted time includes a time between frames being transmitted and a time required for a PHY header (hereinafter, referred to as "header overhead") and a MAC header to be appended to each frame, which causes inefficiency of an entire wireless network. When a 188-byte MPEG-2 transport stream is transmitted, a relatively large header overhead is required due to a high frequency of transmission. This is because an IEEE 802.11 standard requires an ACK for each frame being transmitted.

According to the standard, a size of the MAC header appended to the data frame is 30 bytes, and the time required for the PHY header is 20 μs. Therefore, the header overhead becomes more significant and larger with respect to the data actually being transmitted, thereby decreasing an efficiency of a wireless network.

SUMMARY OF THE INVENTION

The present general inventive concept provides a method and apparatus to improve an overall throughput and to facilitate stable data transmission when an error occurs during data transmission by fixing the error and carrying out re-transmission in a wireless network environment.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of transmitting wireless data, the including transmitting a first data frame containing a plurality of data units to a receiving device, receiving acknowledgment of receipt of each data unit as a response to the first data frame from the receiving device, and transmitting a second data frame containing at least one of the data units that were not transmitted or received, according to the received acknowledgement.

The foregoing and/or other aspects of the present general inventive concept may also be achieved by providing a method of trvrobomh data, the method including receiving a first data frame containing a plurality of data units from a transmitting device, transmitting acknowledgment of each data unit as a response to the data frame, and receiving from the transmitting device a second data frame contains at least one of the data units in which errors have occurred, as a response to the transmitted acknowledgement.

The foregoing and/or other aspects of the present general inventive concept may also be achieved by providing a wireless device, including a data-processing unit that forms a MAC payload containing a plurality of data units received from an application, a MAC module that appends a MAC header to the MAC payload, so as to form an MPDU, and a PHY module which appends a PHY header to the MPDU, so as to form a first data frame, and transmits the first data frame to a receiving device, wherein the data-processing unit forms a second MAC payload containing at least one of the data units which has not been transmitted to or received by the receiving device according to acknowledgment of each data unit received as a response to the first data frame, the MAC module appends the second MAC header to the MAC payload, the PHY module appends the PHY header to the MAC header, so as to form a second data frame, and transmits the second data frame to the receiving device.

The foregoing and/or other aspects of the present general inventive concept may also be achieved by providing a wireless device, including a PHY module to restore an MPDU by receiving a first data frame from a transmitting device and removing a PHY header, a MAC module to restore a MAC payload by removing a MAC header in the MPDU, a data-processing unit to check out a plurality of data units included in the MAC payload to find errors and to execute an application by receiving the error-free data units, wherein the data-processing unit forms a bitmap which represents acknowledgment each data unit depending on whether an error has been found, the MAC module appends a second MAC header to the bitmap, and the PHY module appends a second PHY header to the MAC header so as to form a block ACK and transmits the block ACK to the transmitting device.

The foregoing and/or other aspects of the present general inventive concept may also be achieved by providing a wireless communication system, including a transmitting device to generate a first data frame having two or more data units and to generate a second data frame having one or more data unit which are not the same as the two or more data units and include at least one of the two or more data units, and a receiving device to generate a frame having acknowledgement of receipt of the respective two or more data unit according to the two or more data units.

The foregoing and/or other aspects of the present general inventive concept may also be achieved by providing a wireless communication system, including a transmitting device to generate a first data frame having two or more data units and to generate a second data frame having one or more data unit which are not the same as the two or more data units and include at least one of the two or more data units.

The foregoing and/or other aspects of the present general inventive concept may also be achieved by providing a wireless communication system, including a receiving device to receive a data frame having two or more data units, and to generate a frame having acknowledgement of receipt of the respective two or more data unit.

The foregoing and/or other aspects of the present general inventive concept may also be achieved by providing a method of a wireless communication system, the method including generating a first data frame having two or more data units, generating a second data frame having one or more data unit which are not the same as the two or more data units and include at least one of the two or more data units, and generating a frame having acknowledgement of receipt of the respective two or more data unit according to the two or more data units.

The foregoing and/or other aspects of the present general inventive concept may also be achieved by providing a computer readable recording medium containing computer readable codes to perform a wireless communication method, the method including generating a first data frame having two or more data units, generating a second data frame having one or more data unit which are not the same as the two or more data units and include at least one of the two or more data units, and generating a frame having acknowledgement of receipt of the respective two or more data unit according to the two or more data units.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a view illustrating a wasted time in wireless telecommunications in a conventional wireless network;

FIG. 4 is a view illustrating configurations of frames transmitted over a network according to an embodiment of the present general inventive concept;

FIG. 5 is a view illustrating a configuration of a MAC header of the frame of FIG. 4 according to an embodiment of the present general inventive concept;

FIGS. 8A, 8B, and 8C are views illustrating processes of transmitting a plurality of TSs from a transmitting device to a receiving device;

FIG. 9 is a view illustrating a data frame of FIG. 4 according to an embodiment of the present general inventive concept;

FIGS. 17A through 17I are views illustrating various re-transmission mechanisms in the communication system of FIG. 12.

DETAILED DESCRIPTION OF THE PREFERRED EMBODIMENTS

Figure 1:
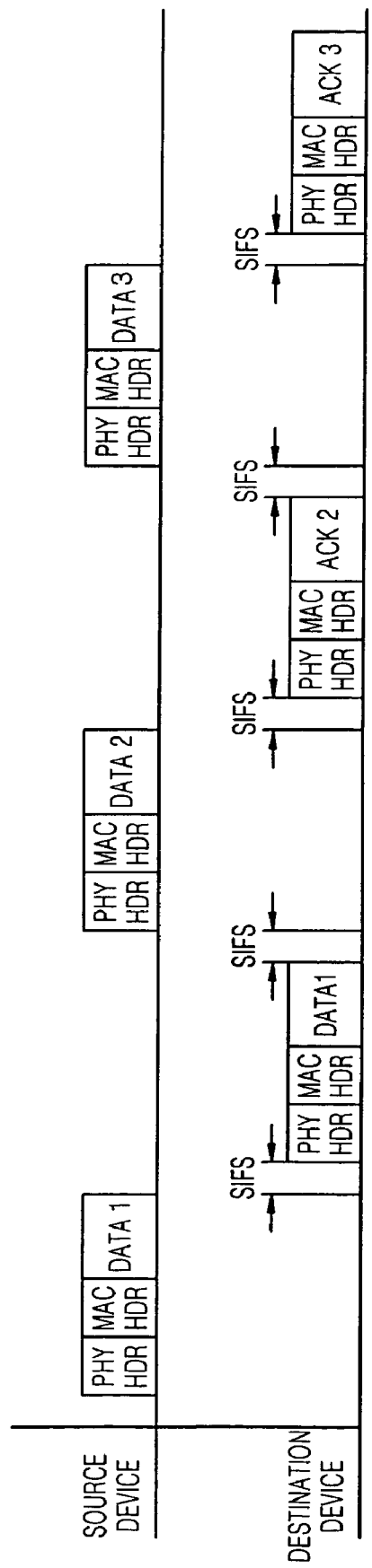
FIG. 1 is a view illustrating a method of transmitting data over a conventional wireless network.
Figure 2:
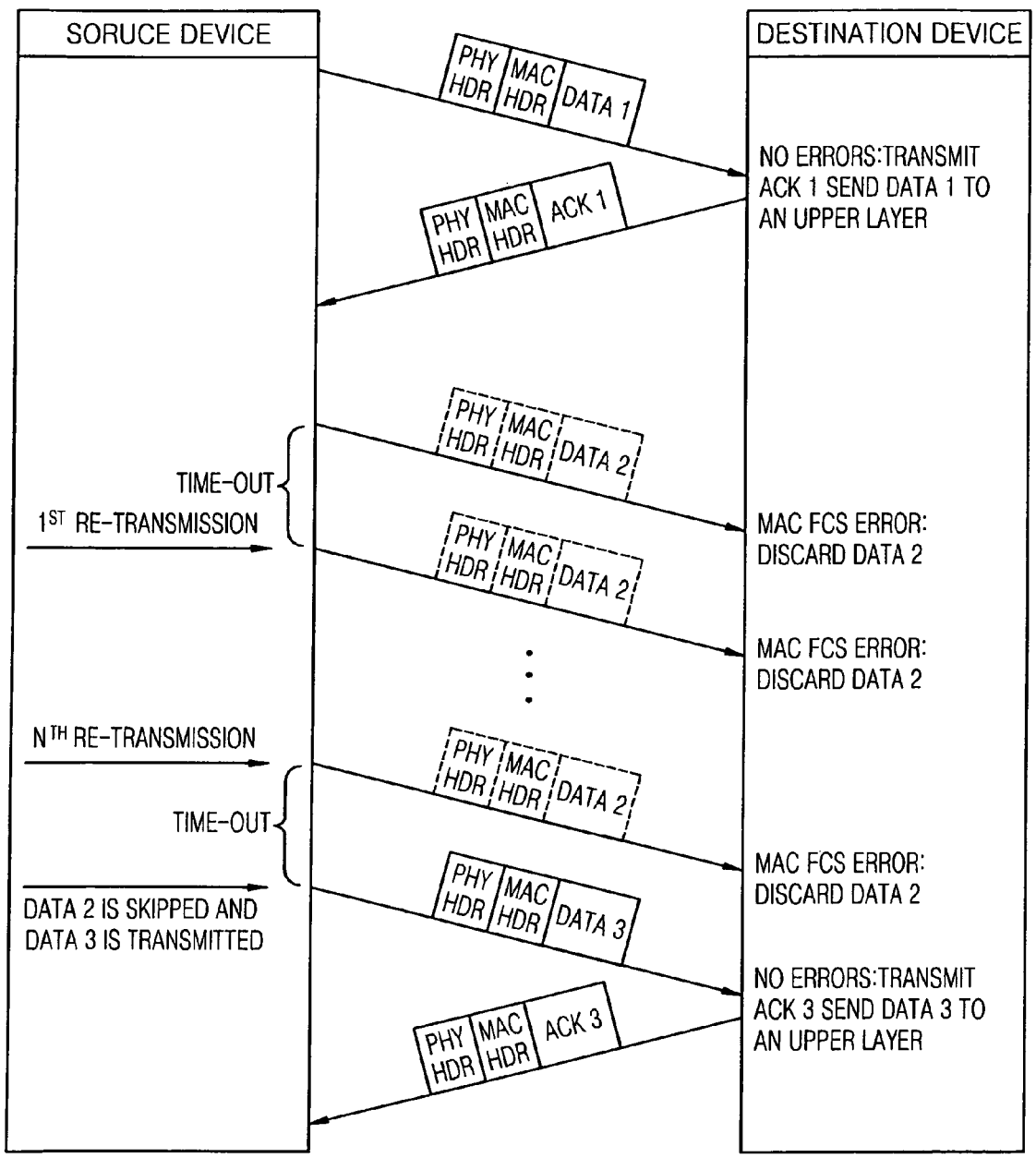
FIG. 2 is a view illustrating a conventional method of handling errors generated during transmission between wireless devices.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 4 is a view illustrating a configuration of a frame 100 and a frame 200 transmitted between a source (transmitting) device and a destination (receiving) device over a network according to an embodiment of the present general inventive concept. The present invention combines data units into a single block (single frame), transmits the combined data units as the single block (single frame), and employs a block ACK (acknowledgement) with information in a bitmap as a response frame to the single block.

The data frame 100 includes a physical layer (PHY) header PHY HDR 41, a media access control (MAC) layer header MAC HDR 42, data units 44, 45, and 46, and a plurality of delimiters 43. The term "data unit" throughout the specification is referred to as a MAC service data unit (MSDU) transmitted to an MAC layer from a layer above the MAC layer. The delimiter 43, positioned between the adjacent data units 44, 45, and 46 or between the MAC header 42 and the data unit 44, may contain number information of a data unit to identify each data unit, checksum information to detect one or more errors in the frame 100, and information on synchronization such as a time stamp. Since a size of payload data specified by the IEEE 802.11 standard is limited to 2304 bytes, a sum of the data units 44, 45, and 46 and the delimiters 43 is limited to the size of the payload data. In the present embodiment, a single block ACK is used as the frame 200 in response to the data frame 100. According to a conventional ACK system, the data frame 100 containing the data units 44, 45, and 46 is treated as a single frame having a single data unit, and must be acknowledged by an immediate ACK in response to the single frame having the single data unit. However, according to the present embodiment, the ACK, as a response to the data frame 100, is in a form of the single block ACK 200 because confirmation of the receipt of the respective data units 44, 45, and 46 included in the frame 100 is required.

A bitmap 47 is included in the block ACK 200 to display one or more errors corresponding to the respective data units 44, 45, and 46, and a transmitting device determines which data unit 44, 45, or 46 needs to be re-transmitted according to this information.

Figure 6:
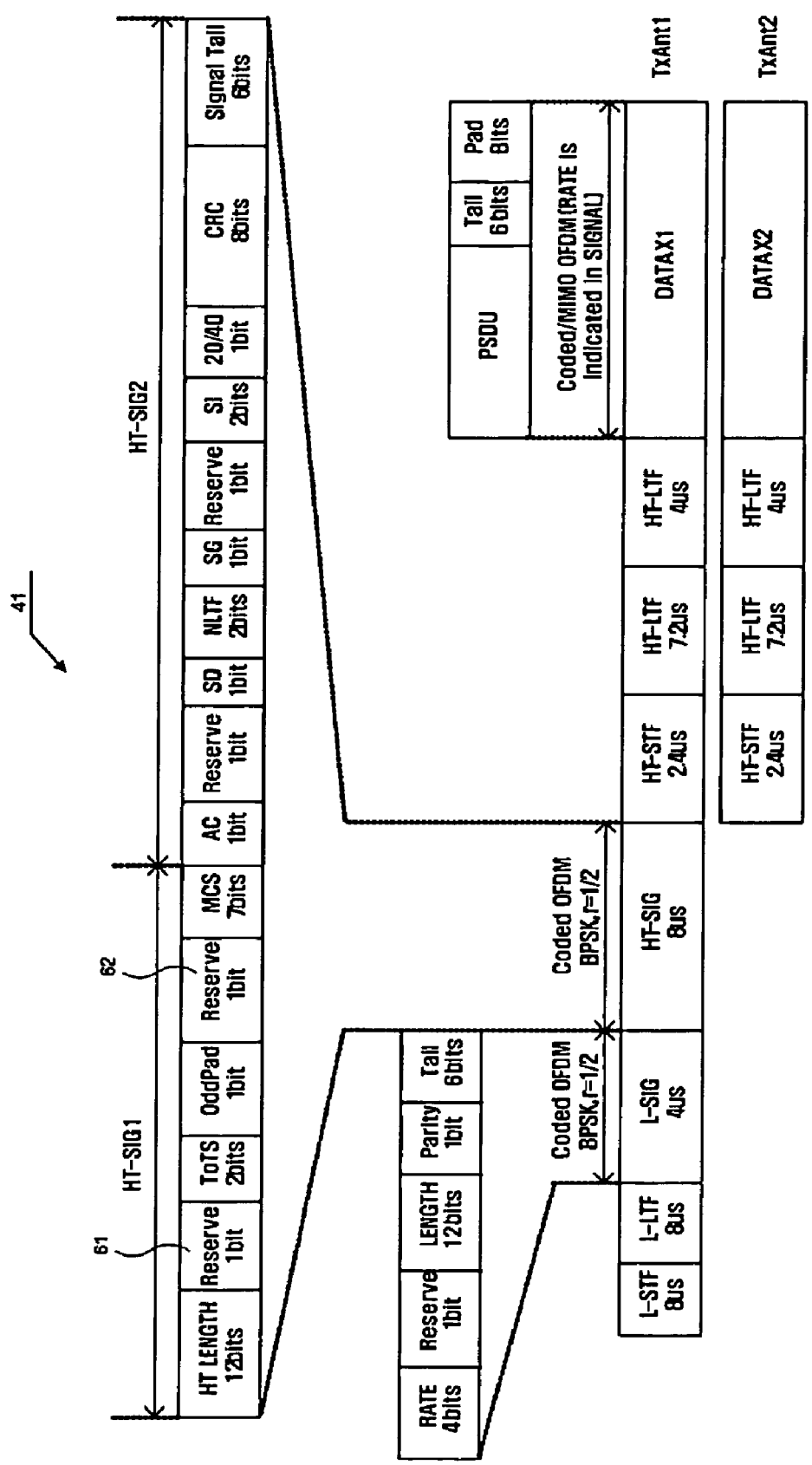
FIG. 6 is a view illustrating a configuration of a PHY header of the frame of FIG. 4 according to an embodiment of the present general inventive concept.

FIGS. 5 and 6 are views illustrating configurations of the MAC header 42 and the PHY header 41, respectively, according to an embodiment of the present general inventive concept. Referring to FIG. 5, the MAC header 42 may have the same configuration as the conventional IEEE 802.11 standard. However, the present general inventive concept is not limited thereto. The configuration of the MAC Header 42 may have a different configuration or arrangement from a conventional MAC header. The MAC header 42 may include a frame control field having two Octets, a duration/ID field having 2 Octets, at least two address fields (either address 1, address 2, address 3, or address 4) each having six Octets, and a sequence control field having two Octets. The definitions and the detailed configurations of each field may be the same as the conventional standard.

Referring to FIG. 6, the PHY header 41 employs an orthogonal frequency division multiplexing (OFDM) modulating method to support Multiple-Input Multiple-Output (MIMO). The configuration of the PHY header 41 is defined in the IEEE 802.11 standard. As an example, a proper PHY header may be employed according to various modulating methods such as a direct sequence spread spectrum (DSSS) and a frequency hopped spread spectrum (FHSS). The PHY header 41 includes a first reserve one bit 61 and a second reserve one bit 62 in a high throughput signal filed (HT-SIG), and also includes an L-STF (legacy short training field), an L-LTF (legacy long training filed), an L-SIG (Legacy signal) field, and a data field (data unit). However, the present general inventive concept is not limited thereto. The configuration of the PHY Header 42 may have a different configuration or arrangement from a conventional PHY header. Since the PHY header 41 is well known, detailed descriptions thereof will be omitted.

Figure 7:
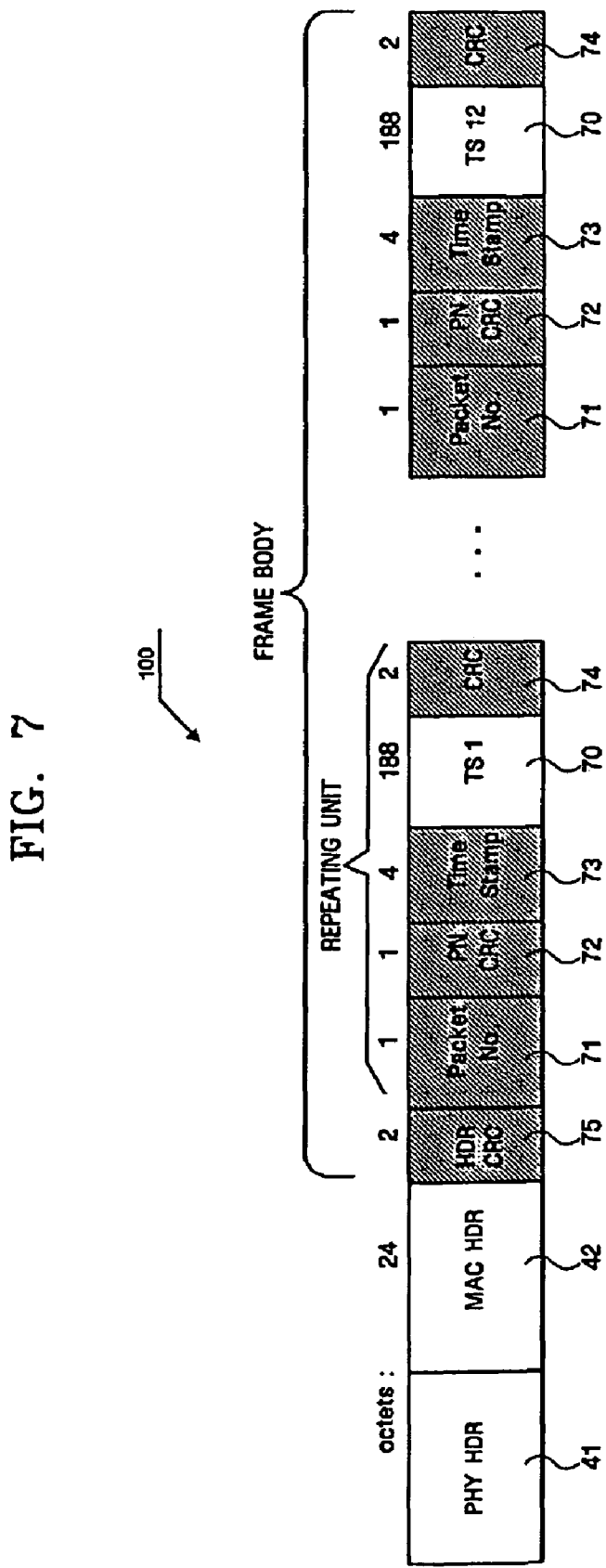
FIG. 7 is a view illustrating a data frame of FIG. 4.

FIG. 7 is a view illustrating a configuration of the data frame 100 of FIG. 4. Referring to FIG. 7, a 188-kb transport stream (hereinafter, referred to as "TS")is used as a single data unit and is included in a frame body of the data frame 100. A delimiter (43) is shaded as illustrated in FIG. 4, and considering a size of an IEEE 802.11 standard MAC frame body, the frame body may include 12 TSs.

A single data unit, that is, the TS, is combined with the delimiter 43, for example, a Packet No. field 71, a PN CRC field 72, a time stamp field 73, and a cyclical redundancy check (CRC) field 74 so as to form a repeating unit corresponding to each single data unit.

The sequence number of each data unit, which is included in the frame body, is indicated in the Packet No. field 71. As illustrated in FIG. 7, the sequence numbers for a total of 12 TSs from TS1 to TS12 are indicated in the Packet No. field 71 in the order in which the TSs reach the MAC layer from upper layers.

A checksum, which checks for errors in the Packet No. field 71, is provided in the PN CRC field 72. A cyclical redundancy check (CRC) is commonly employed to calculate the checksum.

A time spent for the data unit to reach the MAC layer from an upper layer, that is, a value of an internal clock count, is provided in the time stamp field 73 as a tag value. The time stamp field 73 is employed in order to transmit isochronous data, such as the TS, but may not be employed to transmit asynchronous data.

When a plurality of TSs are transmitted between the transmitting device and the receiving device as illustrated in FIGS. 8A, 8B, and 8C, t1, t2 and t3 are recorded in tags TS1, TS2, and TS3, respectively.

When transmitted via a network, the TSs are transmitted with no time intervals between them. The receiving device receives the transmitted TSs, retrieves original time intervals, and sends an MPEG-2 TS to an AV decoder via a stream I/F. When TS1 is output at t4 via the stream I/F, outputting of TS2 is put on hold between time intervals for tag 2 and tag 1, i.e., TS2 is output at t5. TS3 is put on hold between time intervals for tag 3 and tag 2, i.e., TS3 is output at t6.

Outputting the TSs according to the original time intervals in the transmitting unit via the stream I/F enables the AV decoder to decode an AV stream at the right moment.

A checksum which checks for one or more errors in TS data 70 is recorded in the CRC field 74. A cyclical redundancy check (CRC) is commonly employed to calculate a checksum. Another checksum which checks for one or more errors in the time stamp field 73 and the TS data 70 may be recorded in the CRC field 74. A header (HDR) CRC field 75 which records a checksum checking for errors in the MAC header 42 may be included in the frame body.

The configuration of the data frame 100 in FIG. 7 may not be compatible with a configuration of a conventional MAC frame. Considering compatibility with the conventional MAC frame, a data frame 150 may be defined as illustrated in FIG. 9 according to another embodiment of the present general inventive concept. FIG. 9 is a view illustrating the data frame 150 compatible with a MAC frame of the IEEE 802.11 standard. That is, the data frame 150 includes a PHY header 41, a MAC header 42, a frame body, and an FCS field 91. A checksum of all the MAC frames is recorded in the FCS field 91, and the FCS field 91 checks for errors in the entire MAC header 43 and the frame body. The frame body may include a repeating unit having a Packer No. field, a PN CRC field, a time stamp filed, and a CRC filed. A predetermined number of Octets are assigned to the respective fields and headers.

Figure 10:
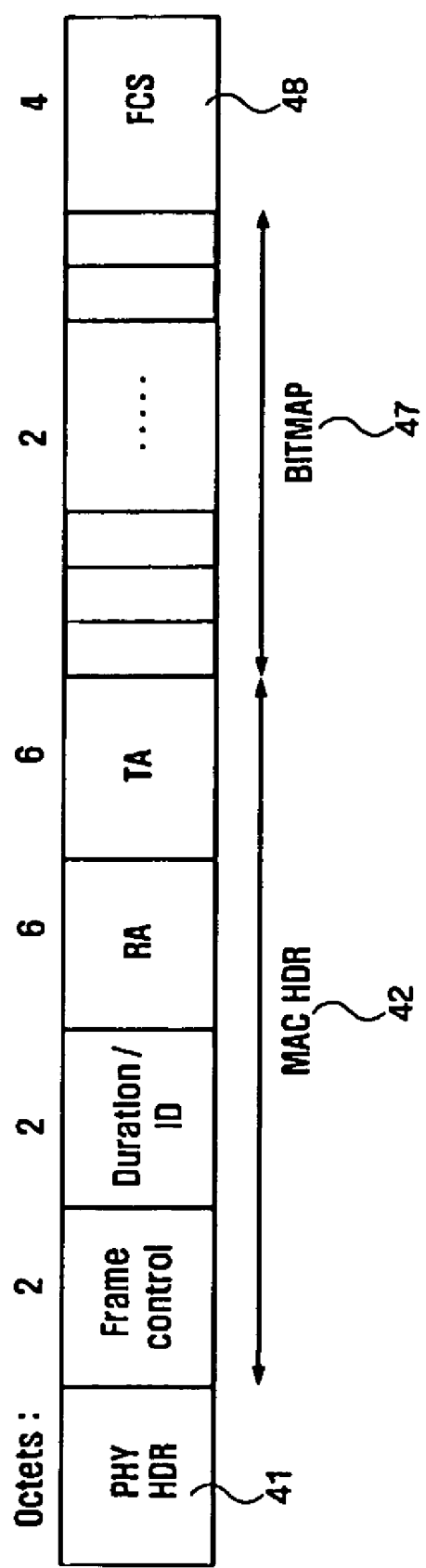
FIG. 10 is a view illustrating a configuration of a block ACK of FIG. 4.

FIG. 10 is a view illustrating a configuration of the block ACK 200 of FIG. 4. The block ACK 200 includes at least a PHY header 41, a MAC header 42, and a bitmap field 47, and may include an FCS field 48. According to the IEEE 802.11 standard, the MAC header 42 in the ACK includes a frame control field, a duration/ID field, an RA field in which is recorded a receiver address, and a TA field in which is recorded a transmitter address.

The bitmap field 47 includes a plurality of bits, and the bits respectively correspond to data unit numbers recorded in the Packet No. field 71, as illustrated in FIG. 7. If the data frame 100 includes 12 data units, 12 bits are used as the bitmap field 47. An nth bit in the bitmap 47 corresponds to an nth TS (TSn). The bit signifies whether the corresponding data unit has been received. For example, the bit may be defined in such a way that 1 signifies successful transmission, and 0 signifies unsuccessful transmission.

Although FIG. 10 illustrates that the bitmap 47 is represented by 2 bytes (or Octets), i.e., the bitmap 47 comprises 16 bits, the present general inventive concept is not limited thereto, and a size of the bitmap 47 is not limited thereto.

Figure 11:
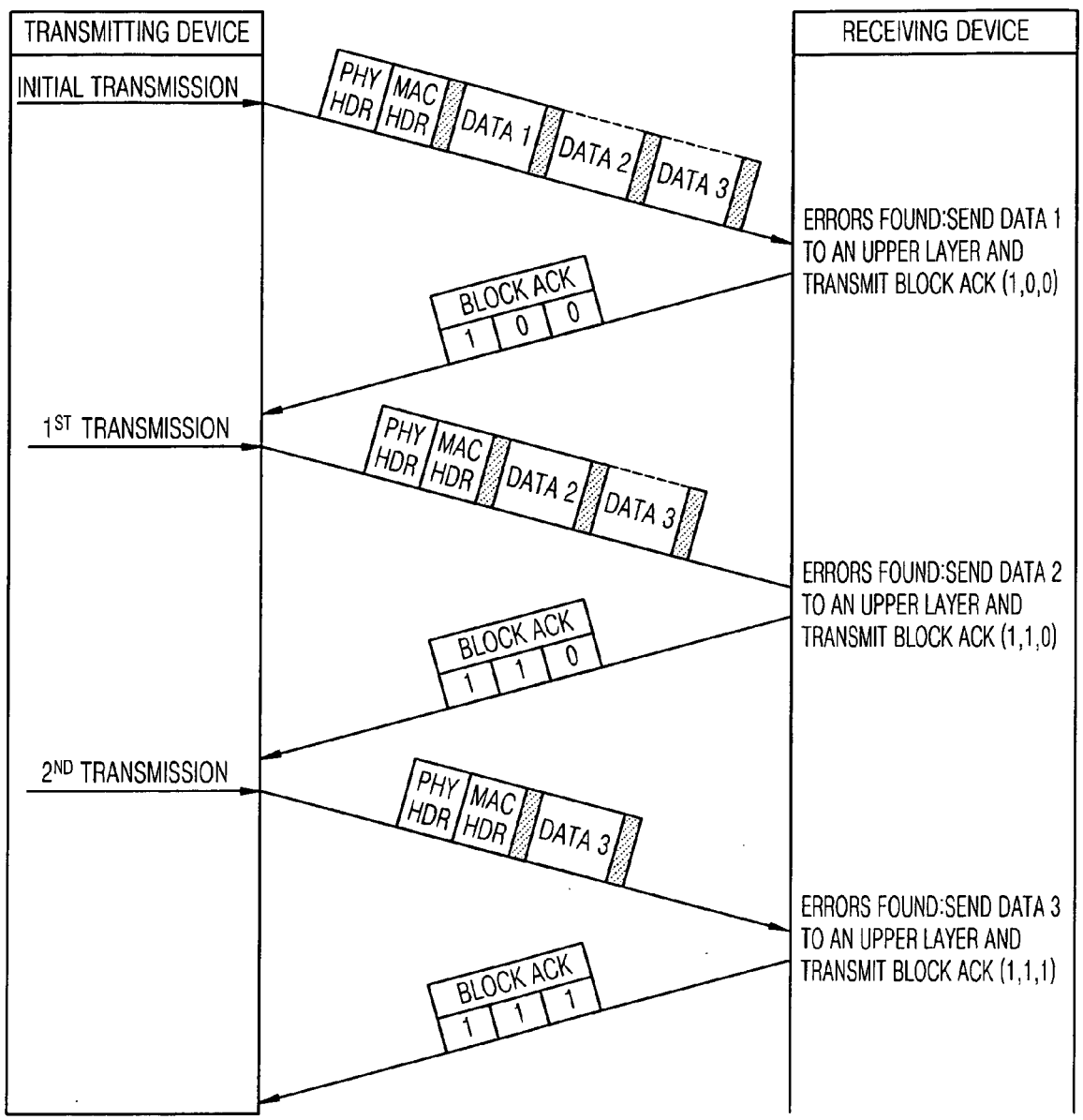
FIG. 11 is a view illustrating a communication method of transmitting and/or receiving data between a transmitting device and a receiving device according to an embodiment of the present general inventive concept.

FIG. 11 is a view illustrating a communication method of transmitting and/or receiving data between a transmitting device and a receiving device according to an embodiment of the present general inventive concept. Referring to FIG. 5, the method includes handling one or more errors which have occurred in a process of frame transmission in a transmitting device and a receiving device.

When a data frame including three (first, second, and third) data units 1, 2, and 3 is transmitted by the transmitting device and one or more errors in the second and third units 2 and 3, the receiving device does not send the received data frame to an upper class because the errors have been detected in the received data frame, and stores the first data unit 1, which is an error-free data unit, in a buffer. The receiving device generates a block ACK including a bitmap of three bits each representing the respective error status of the first, second, and third data units When the transmitting device receives the block ACK and decodes the bitmap (1, 0, 0) included in the block ACK and determines that the second and third data units 2 and 3 were not transmitted or received, and re-transmits a second data frame containing the second and third data units 2 and 3. The retransmitted data frame (second data frame) does not include the first data unit 1.

When an error occurs in the third data unit 3 of the two re-transmitted data units 2 and 3, the receiving device does not send the received data frame to the upper class, and stores the retransmitted second data unit 2, which is an error-free data unit, in the buffer. In addition, the receiving device sets the bitmap, for example, the first and the second bits are set to 1 and the third bit is set to 0, inserts another bitmap (1, 1, 0) in a second block ACK, and transmits the second block ACK having the another bitmap to the transmitting device.

When the transmitting device receives the second block ACK and decodes the bitmap (1, 1, 0) included in the block ACK and determines that the third data unit 3 has not been transmitted or received, and re-transmits a third data frame containing the third data unit 3.

When no error is found in the transmitted third data frame, the receiving device reads the first and second data units 1 and 2 stored in the buffer before sending the received third data unit 3 to the upper class. The receiving device then sends the first, second, and third data units 1, 2, and 3 to the upper class. In addition, the receiving device sets all the bits of the bitmap to 1, inserts another bitmap (1, 1, 1) in a third block ACK, and transmits the bitmap to the transmitting device. The transmitting device determines whether the transmission of the three data units is completed according to the third block ACK having the another bitmap which is information on confirmation of receipt of the respective three data units.

Figure 12:
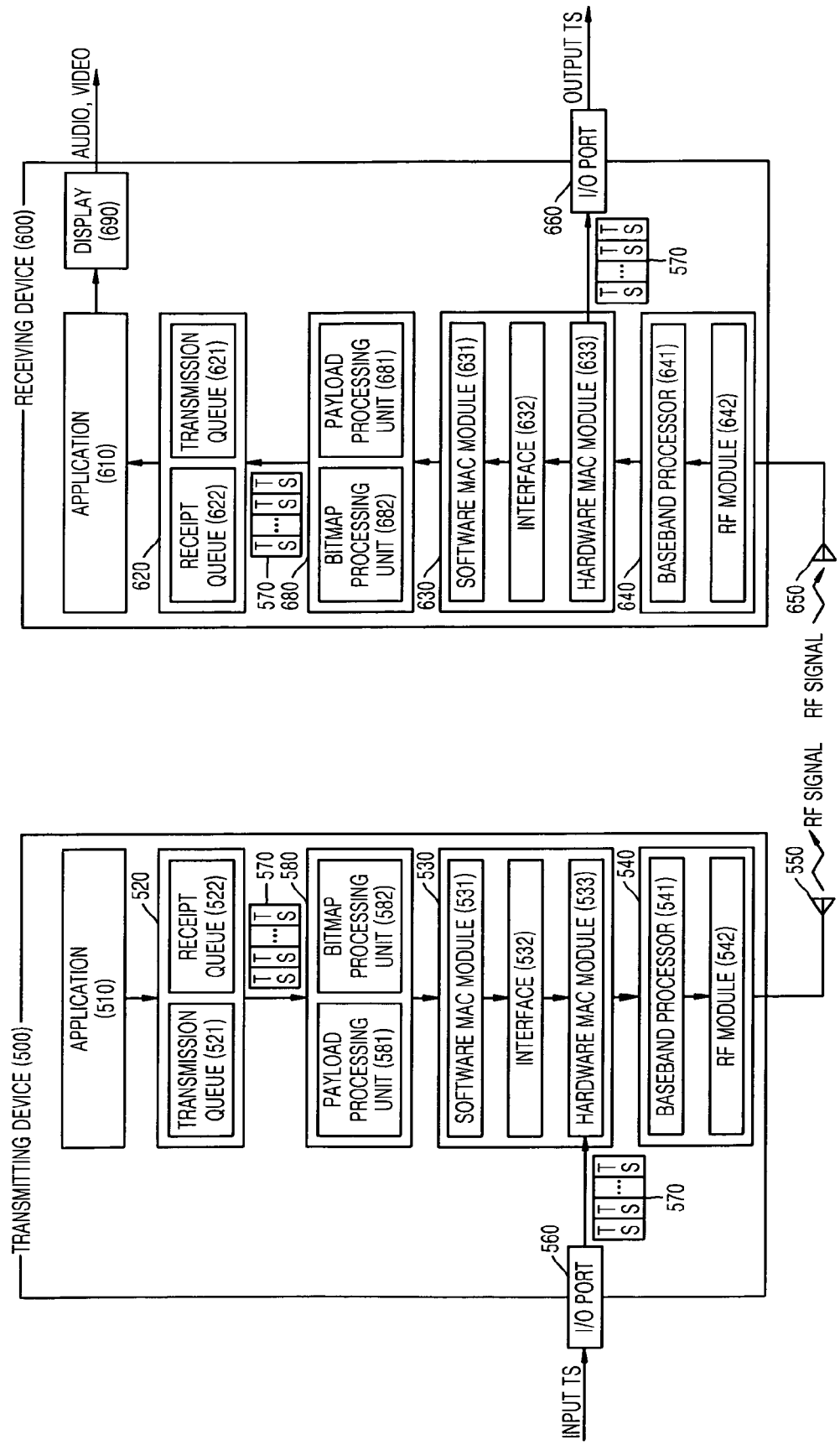
FIG. 12 is a view illustrating a communication system to provide a communication between wireless devices according to an embodiment of the present general inventive concept.

FIG. 12 is a view illustrating a communication system to provide a communication between wireless devices, for example, transmitting and receiving devices 500 and 600 according to an embodiment of the present general inventive concept. The transmitting device 500 and the receiving device 600 may be embodied into a single device. However, FIG. 12 illustrates two different (or separate) devices as an example of the communication system.

Referring to FIG. 12, an application 510 in the transmitting device 500 is a software module that executes an application program, and sends one or more data units (e.g., TSs) generated by the execution of the application program to a device driver 520. The device driver 520, which acts as an interface between classes, includes a transmitting queue 521 that temporarily stores the data units received from the application 510, and a receiving queue 522 that temporarily stores the data units received from a lower class. The queues 521 and 522 store data units on a first-in-first-out (FIFO) basis, i.e., a first input data unit that arrives first is output first as a first output data unit.

A data unit 570 stored in the transmitting queue 521 is sent to a data-processing unit 580. The data-processing unit 580 may include a payload-processing unit 581 and a bitmap processing unit 582. The payload-processing unit 581 inserts a delimiter 43 as illustrated in FIG. 4 in the data unit (e.g., TS) provided by the application 510, so as to form a MAC payload according to the present embodiment. Such a delimiter may include a Packet No. field 71, PN CRC field 72, a timestamp field 73, and a CRC field 74 as illustrated in FIG. 7. In addition, when an error occurs while transmitting a data unit, the payload-processing unit 581 forms another MAC payload with the data unit in which the error occurred and the corresponding delimiter, so that the data frame can be re-transmitted. A process of determining whether an error has occurred involves checking information recorded in a block ACK including a bitmap transmitted by the transmitting device 600.

Figure 13:
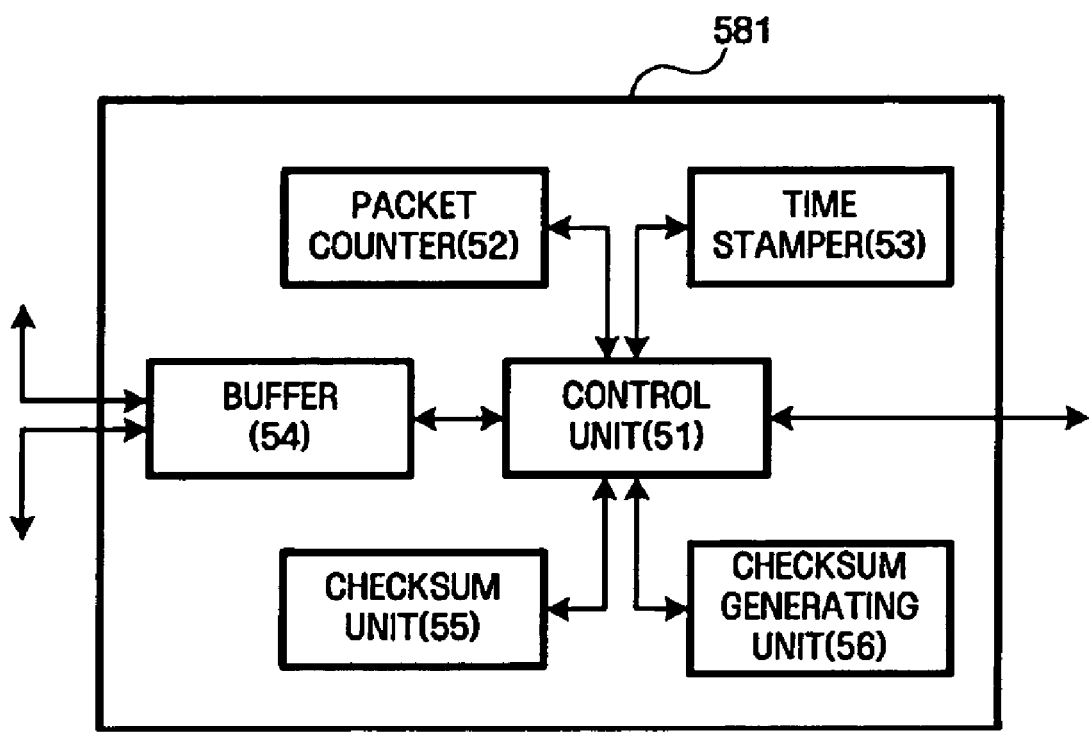
FIG. 13 is a block diagram illustrating a payload-processing unit of the communication system of FIG. 12.

FIG. 13 is a block diagram illustrating the payload-processing unit 581 of the communication system of FIG. 12. Referring to FIGS. 12 and 13, a buffer 54 temporarily stores each data unit 570 received from the transmitting queue 521. A packet counter 52 inserts a serial number into the respective data unit 570 whenever the respective data units 570 arrive from the transmitting queue 521, and a times tamper 53 inserts a value of a clock counter into corresponding ones of the respective data units 570 whenever the respective data unit 570 arrive. The clock counter may be an internal clock counter. A checksum unit 56 computes a value using a checksum of data recorded in the Packet No. field 71 and checks the value against a checksum of the data unit 570 according to a cyclic redundancy checking algorithm.

According to the sequence number, a control unit 51 records a packet number of the data unit 570 in the Packet No. field 71, a checksum of the Packet No. field 71 in the PN CRC field 72, the value of the clock counter in the time stamp field 73, and a checksum of the data unit 570 in the CRC field 74, so as to form the delimiter and the MAC payload with a combination of the formed delimiter and the data units 570.

When the control unit 51 receives a block ACK, and determines that it is necessary to re-transmit some of the data units according to the block ACK because one or more errors have been found, the control unit 51 forms the another MAC payload containing the data units corresponding to the errors, with reference to the numbers of the data units containing errors, which are acknowledged by the bitmap processing unit 582.

The buffer 54 temporarily stores the formed MAC payload, and sends the temporarily stored MAC payload to a MAC module 630 of FIG. 12.

In the meantime, a checksum unit 55 begins to operate when a data frame is received from another wireless device. The checksum unit 55 checks if a checksum recorded in the Packet No. field 71 and a checksum recorded in the PN CRC field 72 are the same. If the checksum of the data units and the checksum recorded in the CRC field 74 are the same, the control unit 51 stores the data units without errors in the buffer 54 but discards the ones with errors. The control unit also provides the bitmap processing unit 582 with a result of the checking operation of the checksum unit 55.

Figure 14:
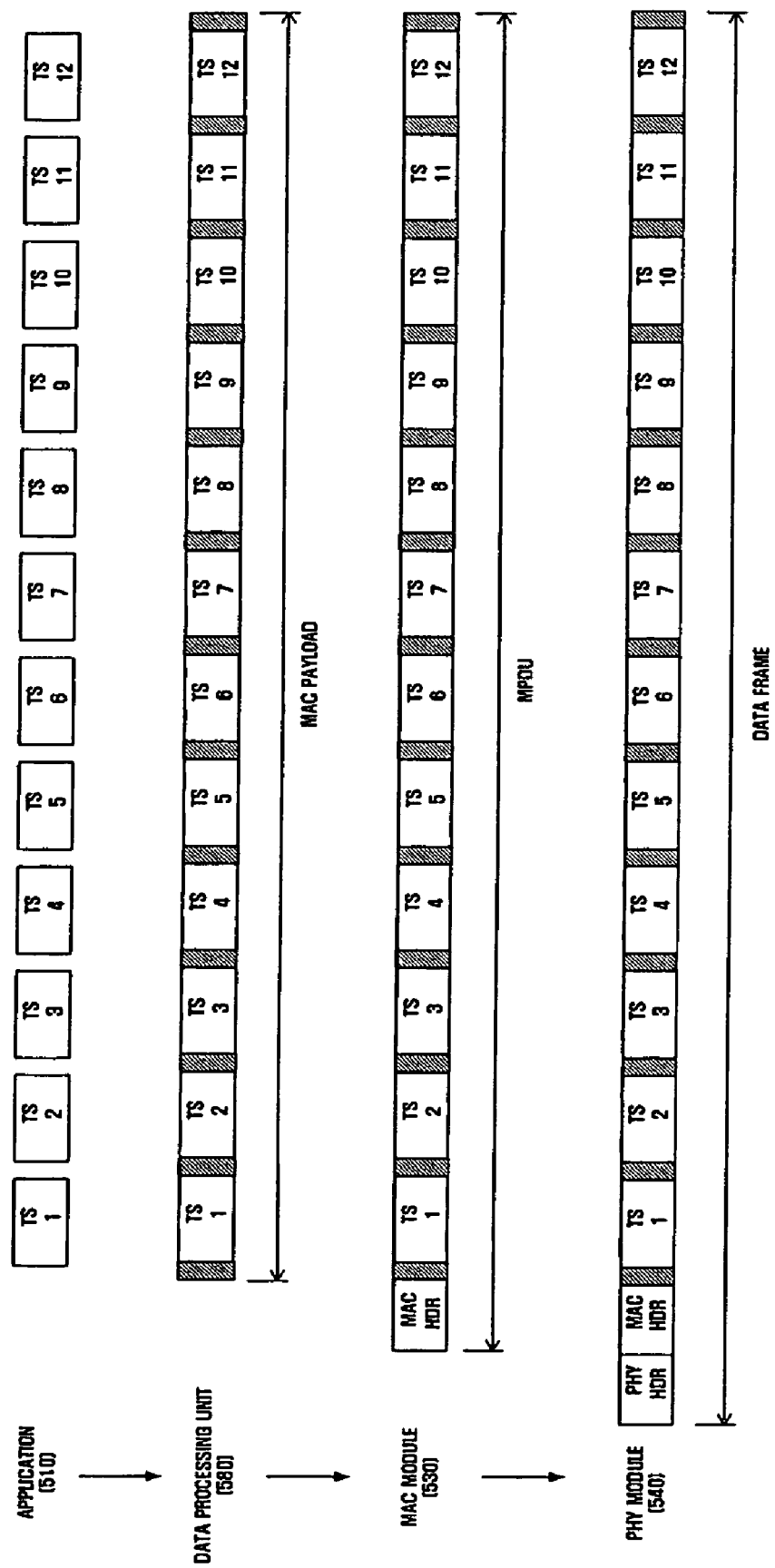
FIG. 14 is a view illustrating a plurality of TSs formed in an application and processed class by class in the communication system of FIG. 12.

FIG. 14 a view illustrating a plurality of TSs formed in an application 510 and processed class-by-class to form a packet in the communication system of FIG. 12. When the plurality of TSs are formed by the application 510, the packet is formed by processing the plurality of TSs class by class. Referring to FIGS. 12 and 14, the data-processing unit 580 combines 12 TSs (from TS1 through TS12) formed in the application 510, and delimiters, so as to form a MAC payload.

The MAC payload is sent to the MAC module 530 and is recognized as a MAC service data unit (MSDU). The MAC module 530 appends a MAC header to the MAC payload, so as to form a MAC protocol data unit (MPDU). Lastly, the PHY module 540 completes a data frame by receiving the MPDU frame and appending the PHY header thereto. Here, the MAC module includes a software MAC module 531, an interface 532, and a hardware MAC module 533 so that appends the MAC header to the MAC payload having the 12 TSs generated from the applications or other TSs 570 received from an input TS source through an I/O port 560. The PHY module includes a baseband processor 541 and a RF module so that the data frame is transmitted as a transmitting signal, for example, an RF signal, to the receiving device 600 through antennas 550 and 850.

The bitmap processing unit 582 in FIG. 12 analyzes a bitmap included in the block ACK transmitted from the receiving device 600, i.e., it reads the bits in the bitmap, checks for an error in at least one of the data units included in the transmitted data frame, and notifies the payload-processing unit 581 of the checking result.

Figure 15:
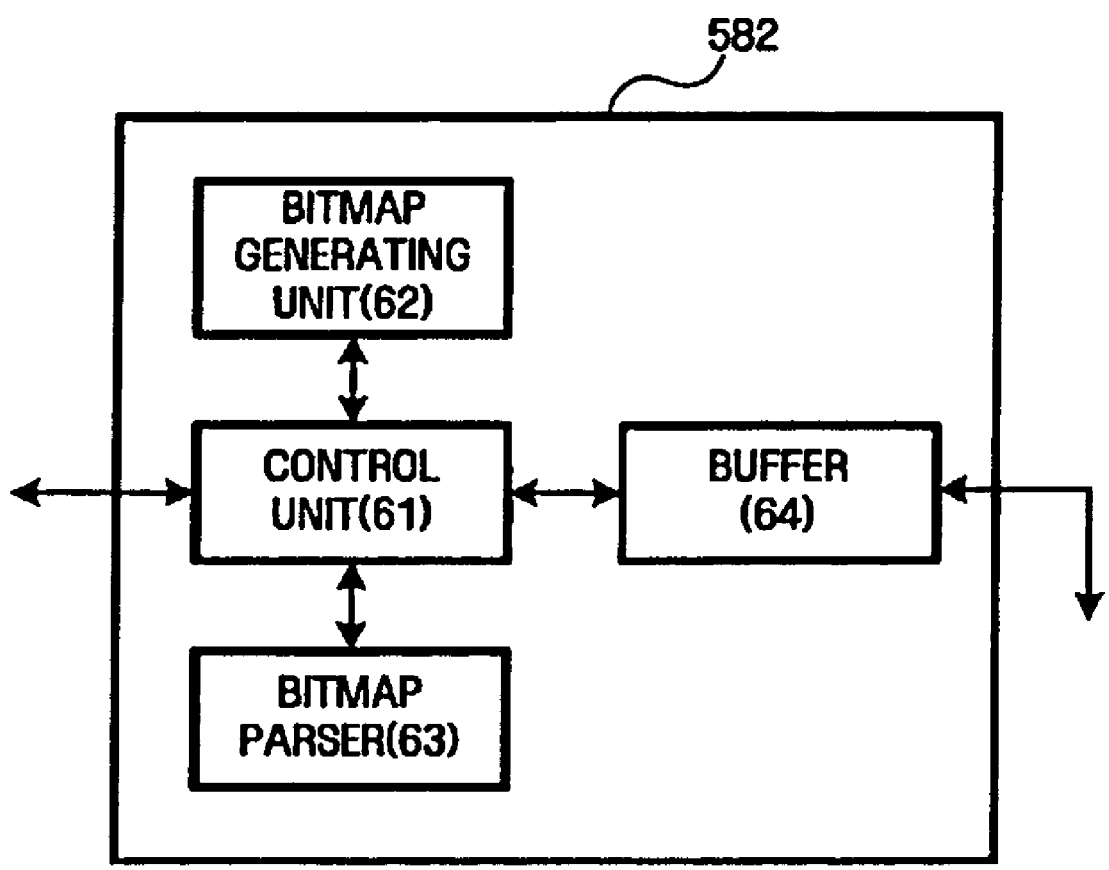
FIG. 15 is a view illustrating a configuration of a bitmap processing unit 582 of a transmitting device of the communication system of FIG. 12.

FIG. 15 is a view illustrating a configuration of the bitmap processing unit 582 of the communication system of FIG. 12. The bitmap processing unit 582, for example, may include a control unit 61, a bitmap-generating unit 62, a bitmap parser 63, and a buffer 64. The bitmap parser 63 reads the bitmap included in the ACK 47 of FIG. 4, checks for an error in each data unit included in the transmitted data frame, and provides the payload-processing unit 581 with the checking result through the control unit 61. Meanwhile, the bitmap-generating unit 62 generates a bitmap, which checks for transmission errors in each data unit, according to a checksum performed in the payload-processing unit 581. The previously generated bitmap is stored in the buffer 64 temporarily, and is then sent to the MAC module 530.

The MAC module 530 appends the MAC header to the MAC payload provided by the data-processing unit 580, so as to form the MPDU. A configuration of the MAC header is illustrated in FIG. 5. The MAC module 530 may be formed by a combination of the software MAC module 531, embodied as software, the hardware MAC module 533 embodied as hardware, and the interface 532 facilitate communications between the software and hardware MAC modules 531 and 533. The software module 531 is responsible for MAC functions that are not time-critical, and the hardware MAD module531 is responsible for time-critical MAC functions.

The PHY module 540 receives the MPDU transmitted by the MAC module 530 and forms a packet protocol data unit (PPDU), and converts the PPDU into a wireless signal in order to transmit the converted PPDU. The PPDU is referred to as a data frame according to the present embodiment. The baseband processor 91 processes a baseband signal corresponding to the data frame, and the radio frequency module 92 generates a signal including the baseband signal and transmits the signal.

As described above, the application 510 may form a data unit by a complex algorithm, and the formed data unit is processed and appended to form the MPDU using the software MAC module. However, when the data unit is received from a broadcasting receiver, such as a TS 570, through the I/O port 560, the data unit can be processed using the hardware MAC module 533 to form the MPDU.

Referring to FIG. 12, the receiving device 600 may have the same elements as a transmitting device 500. The receiving device 600 receives an RF signal from the transmitting device 500 through the antenna 650, restores an MPDU by processing the received RF signals via a PHY module 640, and transmits the MPDU to a MAC module 630.

The MAC module 630 transmits the MAC payload, which is produced by removing the MAC header from the MPDU, to a data-processing unit 680. A payload-processing unit 681 of the data-processing unit 680 decodes a delimiter included in the MAC payload. Here, the delimiter includes the Packet No. field 71, the PN CRC field 72, the timestamp field 73, and the CRC field 74 as illustrated in FIG. 7. Meanwhile, the MAC module 630 appends the MAC header and transmits the appended MAC header to the PHY module 640, according to a bitmap provided by the data-processing unit 680.

The payload-processing unit 681 checks if the Packet No. field 71 has been successfully transmitted without an error via the PN CRC field 72, and decodes the number recorded therein, and the payload-processing unit 681 also checks if the data unit with the aforementioned number has been successfully transmitted via the CRC field 74. The payload-processing unit 681 stores a data unit 670 successfully transmitted from a small buffer (not shown), and then provides it to a receiving queue 622 of a device driver 620.

In the meantime, a bitmap processing unit 682 generates bits, i.e., a bitmap indicating whether an error has occurred in a corresponding one of the data units included in the received data frame, and provides the bitmap to the MAC module 630. The configuration of the bitmap can be seen in FIG. 10. The MAC module 630 appends a MAC header to the provided bitmap, and the PHY module 640 generate the block ACK of FIG. 10 to be sent as the RF signal through the antenna 650 to the transmitting device.

Although FIG. 12 illustrates the transmitting device 500 and the receiving device 600 as separate devices, the transmitting device 500 and the receiving device 600 can be formed in a single device. Accordingly, the applications 510 and 610, the device drivers 520 and 620, the data processing units 580 and 680, the MAC modules 530 and 630, and the PHY modules 540 and 640 are the same, and thus, detailed descriptions thereof are omitted. Also, although FIG. 12 illustrates one directional arrows indicating a signal flow, the arrows may be bidirectional arrows indicating bidirectional signal flows so that the data frame 100 is transmitted from the transmitting device 500 to the receiving device 600, and the block ACK is transmitted from the receiving device 600 to the transmitting device 500. According to the present general inventive concept, a first communication system having a first transmitting device and a first receiving device, such as the transmitting device 500 and the receiving device 600, communicates with a second communication system having a second transmitting device and a second receiving device, such as the transmitting device 500 and the receiving device 600, through a wireless network.

The receiving queue 622 temporarily stores a data unit (e.g., TS) provided from the data-processing unit 680, and transmits the data unit to an application 610 using a FIFO algorithm.

The application 610 executes an application program using the transmitted data unit as an input, and outputs results of the executed data unit (e.g., a decoded A/V signal) via a display unit 690 to generate audio and/or video signals.

Meanwhile, if the MAC module 630 includes a hardware module 633, the MPDU provided by the PHY module 640 is processed directly and re-stored in the data unit 570, and the restored data unit 570 can be output as an output TS via an I/O port. If the output data unit 570 is in the form of a TS or an A/V stream, an external video decoder processes the output A/V stream from the I/O port 680 and is able to restore the audio or video signal.

The configurations of the MAC module 530 and 630 and the PHY module 540 and 640 illustrated in FIG. 12 are mere examples, and the present general inventive concept is not limited thereto.

Many exemplary logic blocks, modules, and circuits explained according to the embodiments of the present general inventive concept may be embodied or carried out by a common processor, a digital signal processor (DSP), an application specific integrated circuit (ASIC), a field programmable gate array (FPGA) or other programmable logical device, a discrete gate or a transistor logic device, discrete hardware elements, or a random combination thereof. The term "common processor" is referred to a microprocessor by definition but may be referred to a conventional processor, a controller, a microcontroller, or a state machine. The processor may also be embodied by a combination of computing devices, e.g., a combination of a DSP and a microprocessor, a multitude of microprocessors, more than one microprocessor related to a DSP core, or other configurations.

A method wherein a transmitting device re-transmits a data unit with an error has been explained so far, but other re-transmission mechanisms can be considered. As a re-transmission mechanism efficiently uses a bandwidth to transmit the data frame, various re-transmission methods considering, for example, a TX transmission rate, adaptation according to a size of data to be transmitted, distribution, duplication, etc., will be described below.

Figure 16:
FIG. 16 is a view illustrating an example of a data frame containing a plurality of data units to be first transmitted in the communication system of FIG. 12.

FIG. 16 is a view illustrating an example of a data frame containing a plurality of data units in the communication system of FIG. 12. Assuming the data frame containing the plurality of data units of FIG. 16 is transmitted by a transmitting device to a receiving device, and second, sixth, and eighth TS2, TS6, and TS8 are not successfully transmitted or received by the receiving device, the present general inventive concept provides re-transmission mechanisms as illustrated in FIG. 17A to FIG. 17I.

FIG. 17A illustrates re-transmission of a data frame containing the data units TS2, TS6, and TS8 with an error as described above. Re-transmission of such a data frame that has failed to be transmitted or received reduces chances of recurrence of errors because a size of the re-transmitted data frame is reduced.

The re-transmission, however, is not limited to the example in FIG. 17A, and the transmitting device may re-transmit the data frame having other data units and the data units TS2, TS6, and TS8 as illustrated in FIG. 17B.

In addition, assuming that a single data frame can hold 12 data units, it is possible that some parts of a MAC payload are wasted if the retransmitted data frame includes the three data units as illustrated in FIG. 17A. In order to avoid wasting the MAC payload, more than three data units can be transmitted through the re-transmitted data frame as a new data frame transmitted together with a combination of the data units TS2, TS6, and TS8, in which errors have occurred. For example, the data units TS13 through TS21 are transmitted as described in FIG. 17C. Such re-transmission may increase the efficiency of a bandwidth use, and boost a streaming speed if the data units are streaming data.

In an environment in which errors are highly likely to occur despite a re-transmission mechanism as illustrated in FIG. 17A, it is possible for the errors to recur. Hence it is possible to arrange and repeat a plurality of the same data units that contain errors, as illustrated in FIG. 17D.

However, the arrangement illustrated in FIG. 17D may not guarantee successful transmission if a burst error occurs. Robustness to burst errors may be increased by alternating the data units that contain errors in the data frame as illustrated in FIG. 17E.

As described above, in the embodiment exemplified in FIG. 17A, the transmitting device re-transmits only the data units with errors, which reduces network traffic, whereas in the embodiments exemplified in FIGS. 17D and 17E, the transmitting device arranges the data units repeatedly in a data frame, which guarantees successful re-transmission despite a loss of other data units. A combination of these two mechanisms, i.e., employing the mechanism illustrated in FIG. 17A for general retransmission and the mechanism illustrated in FIG. 17D or 17E for the last transmission, may increase the efficiency of the retransmission.

If an attempt to re-transmits the data units fails, the transmitting device makes a last attempt at a later time or even abandons the attempt depending upon a method of wireless telecommunications. In either way, a serious problem arises when the last re-transmission fails and a retry limit is reached. Therefore, the mechanism illustrated in FIG. 17D or FIG. 17E is highly suggested for the last re-transmission even through there is an inefficiency in traffic.

FIG. 17F illustrates a re-transmission mechanism obtained by combining the mechanism illustrated in FIG. 17A with the mechanism illustrated in FIG. 17D. In this mechanism, only data units that have failed to be transmitted are transmitted, wherein a MAC payload filled with the data units that are to be transmitted is retransmitted last. Here, the data units that are to be transmitted are contiguously and repeatedly arranged.

FIG. 17G illustrates a re-transmission mechanism obtained by combining the mechanism illustrated in FIG. 17A with the mechanism illustrated in FIG. 17E. In this mechanism, only data units that have failed to be transmitted are transmitted, wherein a MAC payload filled with the data units that are to be transmitted is retransmitted last. Here, the data units to be transmitted alternate in the MAC payload.

In addition to these re-transmission mechanisms, link adaptation may be employed for re-transmission by modifying transmission parameters, such as a transmission (TX) rate, a TX power, and a type of an antenna, such as MIMO or SISO. These modifications can be made via the MAC module 530. The MAC module 530 guarantees more stable transmission, for example, by lowering the TX rate, raising the TX power, or switching the antenna type from the MIMO to the SISO while the re-transmission is repeated. Six of the re-transmission mechanisms according to the link adaptation (hereinafter, referred to as "link adaptation mechanism") will be explained below.

The first method is adaptively modifying the TX rate according to a retransmission number. The method includes setting the TX rate according to the retransmission number, and re-transmitting the data frame at a rate corresponding to the retransmission number. The retransmission number and the TX rate are inversely proportional.

For example, assuming that a criterion is classified as a retransmission number under 1, a retransmission number between 2 and 3, a retransmission number between 4 and 5, and a retransmission number between 6 and 7 and the TX rates are set to 108 Mbps, 96 Mbps, 72 Mbps, and 54 Mbps, respectively, the data frame is re-transmitted at 108 Mbps for an initial attempt, and at 96, 72, or 54 Mbps for following attempts.

The second method is to adaptively modify the TX rate according to the size of a data frame. The size of the data frame and the TX rate are inversely proportional.

For example, defining the size of a data frame to be the number of data units to be retransmitted and assuming that the criterion section is classified as a size under 4, a size between 5 and 8, a size between 9 and 12 and the TX rates are set to 108 Mbps, 72 Mbps, and 54 Mbps, respectively, the data frame is re-transmitted at 108 Mbps, 72 Mbps, and 54 Mbps according to the number of data units in the data frame. Since the successfully transmitted data units are not included in the data frame, the size of the data frame to be re-transmitted decreases while the TX rate increases.

The third method is adaptively modifying the TX size according to the retransmission number. The retransmission number and the TX size are proportional. The size of the re-transmitted data frame may be defined by the number of data units therein.

For example, assuming the criterion is classified as a retransmission under 3, a retransmission between 4 and 5, and a retransmission between 6 and 7, the number of data units to re-transmitted is set to 4, 8, and 12, respectively, as illustrated in FIG. 17H, the actual number of the data units to be re-transmitted is three (TS2, TS6, and TS8) on a first attempt, yet four data units are re-transmitted according to the aforementioned criterion. An additional data unit included in the data frame can be the first data unit (TS2), but the present general inventive concept is not limited thereto. If the data unit TS8 has been successfully re-transmitted on the first attempt while other TSs are not successfully transmitted, a data frame with four data units (two TS2s and two TS6s) arranged alternately is re-transmitted on a second attempt.

If the data units TS2 and TS6 have not been successfully transmitted, eight data units should be transmitted on a fourth attempt because the retransmission number is between 4 and 5, a data frame with eight data units of TS2s and TS6 arranged alternatively is re-transmitted.

The fourth method is adaptively modifying the TX size according to the number of the data units to be re-transmitted. The number of data units and the TX size are proportional.

Figure 17I:
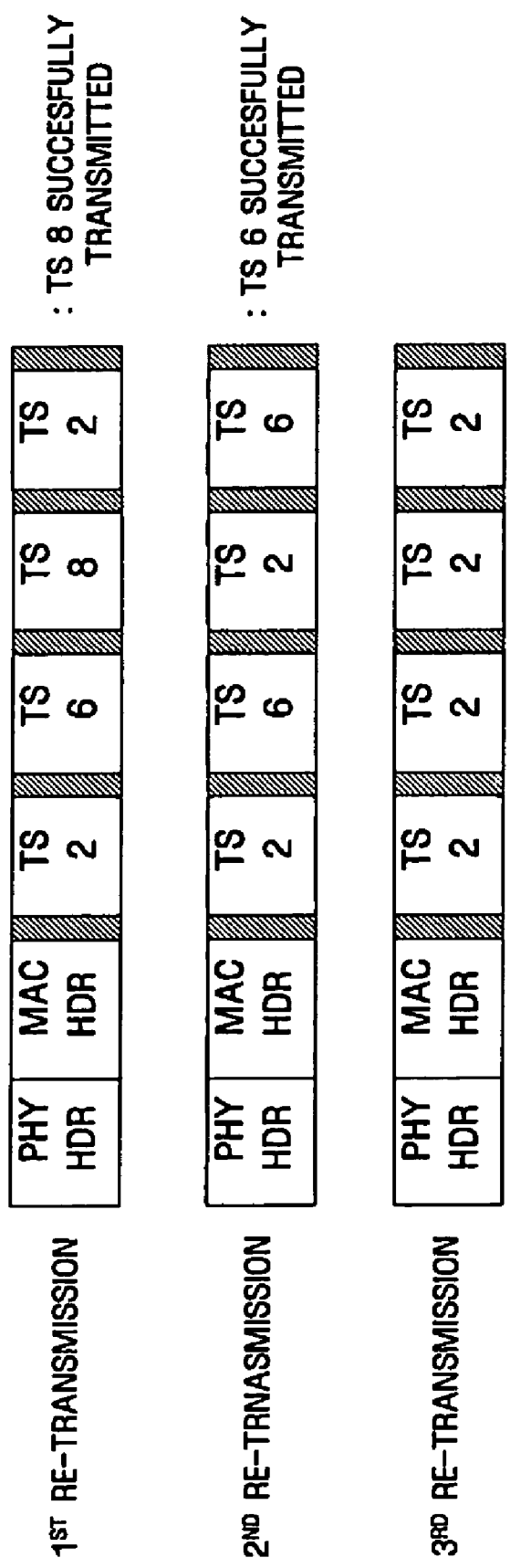

For example, assuming that the criterion is classified as a number under 4, a number between 5 and 8, and a number between 9 and 12 and that the number of data units to be re-transmitted is set to 4, 8, and 12, respectively, as illustrated in FIG. 17I, the actual number of data units to re-transmit is three (TS2, TS6, and TS8) on a first attempt, yet four data units are re-transmitted according to the aforementioned criterion. If TS8 has successfully been re-transmitted on the first attempt while the others are not transmitted, a data frame with four data units (two TS2s and two TS6s) arranged repeatedly is re-transmitted in a second attempt.

If the data unit TS6 has been successfully transmitted in the second attempt, a data frame with four TS2s arranged in a repeated pattern is re-transmitted according to the configured setting.

In order to be compatible with a telecommunication method according to the conventional IEE 802.11 protocol, a frame transmitting mechanism and a block ACK mechanism according to the present general inventive concept may be selectively employed. For example, whether the mechanism has been employed is recorded in the reserved bits 61 and 62 in the PHY header as illustrated in FIG. 6.

Figure 18:
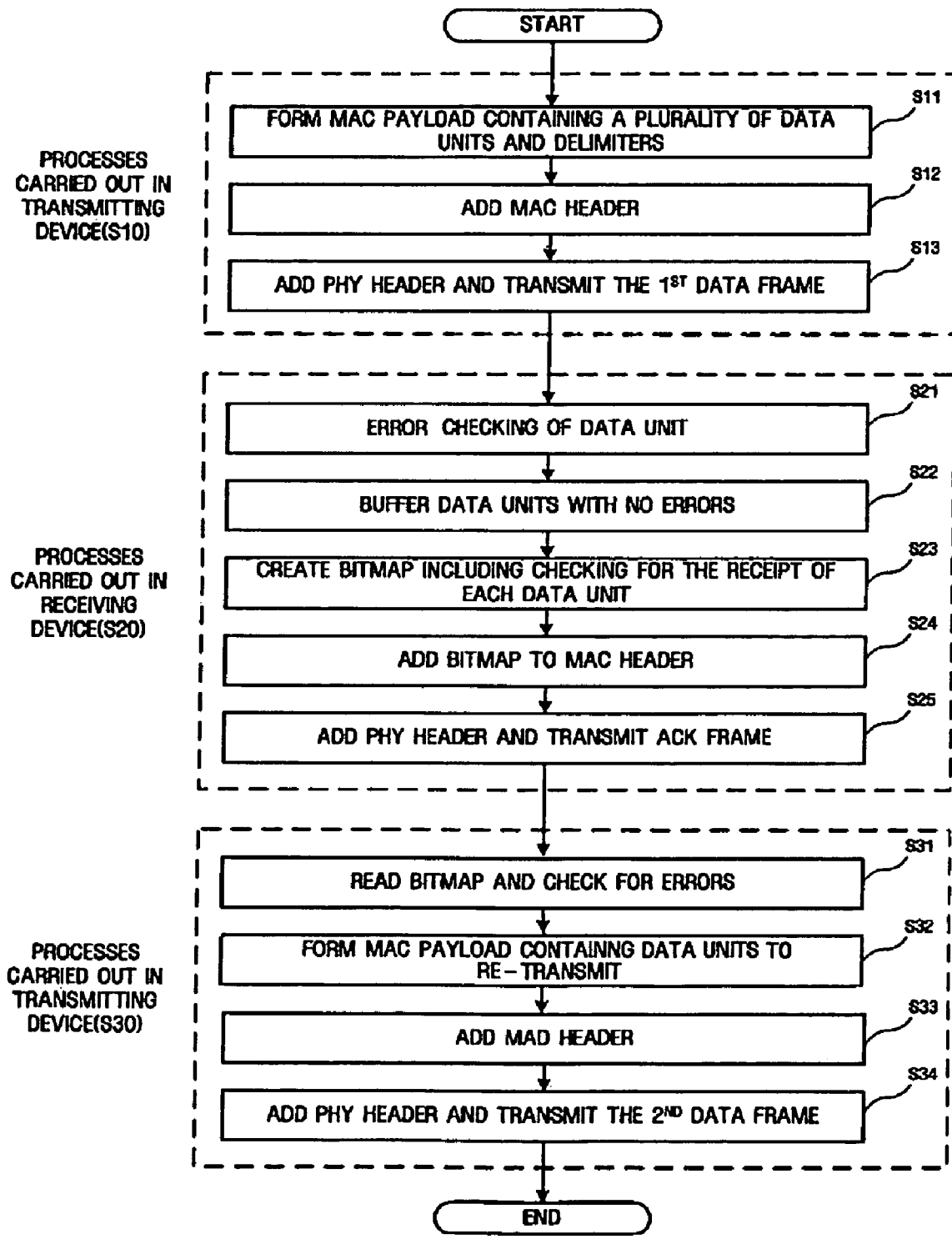
FIG. 18 is a flowchart illustrating a telecommunication method of transmitting and/or receiving data between wireless devices according to an embodiment of the present general inventive concept.

FIG. 18 is a flow chart illustrating a telecommunication method between wireless devices according to an embodiment of the present general inventive concept. Specifically, the method may include three operations: a first operation S10 in which a transmitting device 500 transmits a data frame 1 (a first data frame to be transmitted) containing a plurality of data units to a receiving device 600; a second operation S20 in which the receiving device 600 transmits confirmation of receipt of each data unit as a response to the data frame to the transmitting device; and a third operation S30 in which the transmitting device 500 transmits a second data frame containing data units that have not been successfully transmitted, according to the received confirmation.

Referring to FIGS. 12 and 18, in operation S10, the payload-processing unit 581 in the transmitting device 500 forms a MAC payload including a plurality of data units provided by the application 510 and the one or more delimiters 43 of FIG. 4 at sub-operation S11. The MAC module 530 appends a MAC header to the MAC payload, so as to form a MPDU at sub-operation S12. The PHY module 540 appends a PHY header to the MPDU, so as to form the first data unit which will be transmitted to the receiving device 600 at sub-operation S13.

In operation S20, the first data frame is transmitted to the payload-processing unit 681 via the PHY module 640 and the MAC module 630. The payload-processing unit 681 checks for errors in the data units included in the first data frame which has been transmitted at sub-operation S21, and the error-free data units are stored in a buffer memory which may be included in the payload processing unit 681, at sub-operation S22. The bitmap processing unit 682 receives the checking result and forms a bitmap containing confirmation of receipt of respective data units included in the first frame according the received checking result at sub-operation S23. The MAC module 640 appends the MAC header to the bitmap formed at sub-operation S24, and the PHY module 640 appends the PHY header to the bitmap, so as to form a block ACK, which is transmitted to the receiving device 500 at sub-operation S25.

In operation S30, the blockACK is transmitted to the bitmap processing unit 582 via the PHY module 540 and the MAC module 530. The bitmap processing unit 582 reads the bitmap included within the block ACK in order to search for the data unit in which an error has occurred at sub-operation S31. The payload-processing unit 581 generates data unit sequence numbers and forms the MAC payload containing the data unit with the error and the delimiter at sub-operation S32. The MAC module 530 then appends the MAC header to the MAC payload at sub-operation S33. The PHY module 540 then appends the PHY header to the MPDU to form a second data frame, and transmits the second data frame to the receiving device 600 at sub-operation S34.

Figure 19:
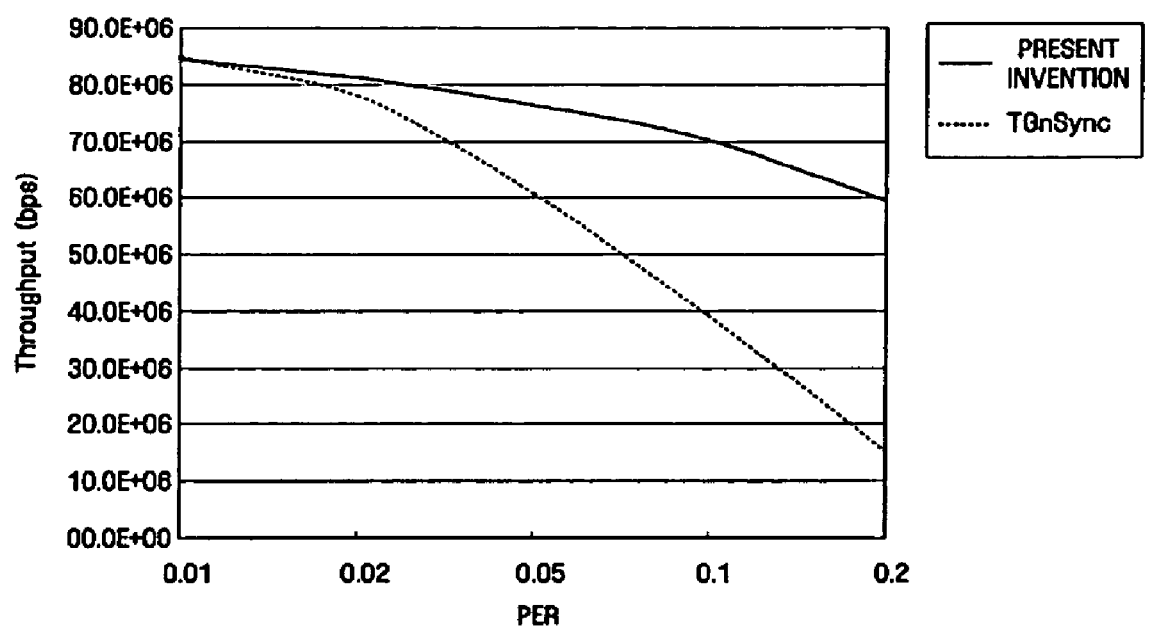
FIG. 19 is a graph illustrating a result of an experiment carried out according to the present general inventive concept and a result of another experiment carried out according to a method suggested in TCn Sync.

FIG. 19 is a graph comparing a result of an experiment carried out according to the present general inventive concept to a result of another experiment carried out according to a conventional method suggested by the TCn Sync multi-industry group. TCn Sync is a group of industries allied for implementing the IEEE 80211 n standard. A greatest TX rate in the experiment is 108 Mbps and a single data frame holds 8 TSs.

The graph illustrates how a packet error rate (PER) increase affects the throughput. When the PER is low, i.e., when optimum conditions for telecommunications occur, there is no considerable difference; however, as the PER increases, the TX rate sharply decreases in the result of TGn-Sync, whereas the TX rate according to the present embodiment does not decrease sharply. In fact, an error is most likely to occur in a wireless telecommunication environment because a wireless channel is shared among many wireless devices.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

According to the present general inventive concept as described above, a plurality of data units can be transmitted via a single data frame. Even if errors occur in some of the data units during transmission, overall transmission efficiency can still be improved by minimizing the recurrence of errors and a re-transmission frequency via an efficient method of fixing the errors.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of transmitting wireless data, the method comprising:
   transmitting a first data frame containing a plurality of data units to a receiving device;
   receiving acknowledgment of receipt of the respective data units as a response to the data frame from the receiving device; and
   transmitting a second data frame containing one or more of the data units that were not transmitted according to the confirmation of the receipt of the respective data units, the second data frame comprises a predetermined number of the data units which have not been successfully transmitted, the predetermined number of the data units being contiguously and repeatedly arranged, the transmitting of the second data frame including:
   setting a plurality of retransmission number criteria;
   determining whether the retransmission number corresponds to at least one of the retransmission number criteria; and
   transmitting the second data frame at a rate corresponding to the determined criterion.

2. The method of claim 1, wherein the acknowledgment of receipt of each data unit is represented in a bitmap included within a single frame.

3. The method of claim 2, wherein the data unit is a transport stream according to the MPEG-2 standard.

4. The method of claim 2, wherein the first data frame and the second data frame include a PHY header, a MAC header, the data units, and a plurality of delimiters.

5. The method of claim 4, wherein the PHY header and the MAC header have a format according to the IEEE 802.11 standard.

6. The method of claim 5, wherein each delimiter includes a field in which a sequence number for the data unit is recorded, and a second field in which a checksum for an error check is recorded.

7. The method of claim 6, wherein the delimiter further comprises a third field in which is recorded another checksum which checks for an error in the field in which the sequence number is recorded, and a fourth field in which a time when the data unit has reached a MAC layer is recorded.

8. The method of claim 4, wherein the PHY header comprises a bit which indicates whether the data frame has been transmitted according to an IEEE 802.11 standard.

9. The method of claim 2, wherein the bitmap comprises the same number of bits as the data units, and the bits represent acknowledgment of the respective data units.

10. The method of claim 9, wherein a size of the bitmap is 2 bytes.

11. The method of claim 2, wherein the transmitting of the second data frame comprises:
  containing the untransmitted data units through the first data frame according to a last re-transmission corresponding to a retry limit, and including in the second data frame the data units in which errors have occurred; and
  including a predetermined number of one or more data units which have not been successfully transmitted, in the second data frame.

12. The method of claim 2, wherein:
  including in the second data frame one or more data units in which errors have occurred, according to a last re-transmission corresponding to a retry limit;
  including the data units in which the errors have occurred in the second data frame according to the retry limit.

13. The method of claim 2, wherein the transmitting of the second data frame comprises:
  setting a plurality of TX size criteria;
  determining whether a TX size corresponds to one of the TX size criteria; and
  transmitting the second data frame at a rate corresponding to the determined criterion.

14. The method of claim 13, wherein the TX size is defined by the number of the data units included in the second data frame.

15. A method of transmitting wireless data, the method comprising:
  transmitting a first data frame containing a plurality of data units to a receiving device;
  receiving acknowledgment of receipt of the respective data units as a response to the data frame from the receiving device; and
  transmitting a second data frame containing one or more of the data units that were not transmitted according to the confirmation of the receipt of the respective data units, the second data frame comprises a predetermined number of the data units which have not been successfully transmitted, the predetermined number of the data units being contiguously and repeatedly arranged, the transmitting of the second data frame comprises:
  setting a plurality of data unit number criteria;
  determining one of the data unit number criteria; and
  transmitting the second data frame having a size that corresponds to the determined criterion.

16. A method of receiving wireless data, the method comprising:
  receiving a first data frame containing a plurality of data units from a transmitting device;
  transmitting acknowledgment of receipt of respective data units as a response to the first data frame; and
  receiving from the transmitting device a second data frame containing data units in which errors have occurred according to the acknowledgement, the second data frame including a predetermined number of the data units which have not been successfully transmitted, the predetermined number of the data units being contiguously and repeatedly arranged, and that the received second data frame is transmitted at a rate that corresponds to at least one of a transmission number criteria.

17. A method of a wireless communication system, the method comprising:
  generating a first data frame having two or more data units;
  generating a second data frame having one or more data units which are not the same as the two or more data units and include at least one of the two or more data units, the one or more data units are contiguously and repeatedly arranged, the generating the second data frame including:
  setting a plurality of transmission number criteria;
  determining whether the transmission number corresponds to at least one of the transmission number criteria; and
  transmitting the second data frame at a rate corresponding to the determined criterion; and
  generating a frame having acknowledgement of receipt of the respective two or more data unit according to the two or more data units.

18. The method of claim 1, wherein at least a portion of the predetermined number of the data units being arranged alternately in the second frame.

19. The method of claim 17, wherein at least a portion of the one or more data units are arranged alternately in the second data frame.

* * * * *